(12) United States Patent
Egi

(10) Patent No.: US 12,124,232 B2
(45) Date of Patent: Oct. 22, 2024

(54) PROGRAMMABLE LOGIC CONTROLLER THAT SUPPLIES A TARGET COMMAND TO CONTROL A TARGET DEVICE

(71) Applicant: OMRON Corporation, Kyoto (JP)

(72) Inventor: Mamoru Egi, Otsu (JP)

(73) Assignee: OMRON Corporation, Kyoto (JP)

( * ) Notice: Subject to any disclaimer, the term of this patent is extended or adjusted under 35 U.S.C. 154(b) by 439 days.

(21) Appl. No.: 17/419,556

(22) PCT Filed: Jan. 10, 2020

(86) PCT No.: PCT/JP2020/000749
§ 371 (c)(1),
(2) Date: Jun. 29, 2021

(87) PCT Pub. No.: WO2020/145403
PCT Pub. Date: Jul. 16, 2020

(65) Prior Publication Data
US 2022/0075333 A1    Mar. 10, 2022

(30) Foreign Application Priority Data
Jan. 11, 2019    (JP) .................................. 2019-003607

(51) Int. Cl.
*G05B 13/04*    (2006.01)
*G05B 19/05*    (2006.01)
*G06F 17/18*    (2006.01)

(52) U.S. Cl.
CPC ........... *G05B 13/048* (2013.01); *G05B 19/05* (2013.01); *G06F 17/18* (2013.01); *G05B 2219/14073* (2013.01)

(58) Field of Classification Search
CPC ................. G05B 13/048; G05B 19/05; G05B 2219/14073; G06F 17/18; B25J 9/16
See application file for complete search history.

(56) References Cited

U.S. PATENT DOCUMENTS

2005/0126833 A1    6/2005    Takenaka et al.
2005/0179417 A1*   8/2005    Takenaka ............... B25J 13/088
                                                      318/568.12
(Continued)

FOREIGN PATENT DOCUMENTS

CN        1447932 A    10/2003
CN      102681489 A     9/2012
(Continued)

OTHER PUBLICATIONS

Bertram, WO-2019002587-A1 English Machine Translation, published Jan. 3, 2019 (Year: 2019).*
(Continued)

*Primary Examiner* — Kenneth M Lo
*Assistant Examiner* — Jonathan Michael Skrzycki
(74) *Attorney, Agent, or Firm* — ROSSI, KIMMS & McDOWELL LLP

(57) ABSTRACT

A control device is configured to cause an output of a target device to be servo-controlled to follow a predetermined command in a predetermined working coordinate system. The control device includes: a target model controller that possesses a target model in which the target device is modeled based on the predetermined working coordinate system and simulates and outputs an output according to the predetermined working coordinate system by using the target model; a model predictive controller that possesses a predictive model in which a correlation between a predetermined state variable that is related to the target model possessed by the target model controller and based on the predetermined working coordinate system and a control input to the target model controller is defined in a form of a predetermined state equation based on the predetermined working coordinate system; and a calculator that calculates a target command from the output of the target model
(Continued)

controller, based on the predetermined working coordinate system for each control axis and in accordance with a geometric relationship of a machine structure of the target device. The control device supplies the target command to the target device. This configuration can perform the model predictive control to supply a target command for causing the output of the target device to appropriately follow a predetermined command.

19 Claims, 10 Drawing Sheets

(56) References Cited

U.S. PATENT DOCUMENTS

| | | | |
|---|---|---|---|
| 2008/0036413 | A1 | 2/2008 | Ohta et al. |
| 2010/0217434 | A1* | 8/2010 | Hellberg ............... B25J 9/1674 901/30 |
| 2012/0239199 | A1* | 9/2012 | Danko .................... E02F 3/439 700/264 |
| 2015/0231786 | A1* | 8/2015 | Doi ........................ B25J 9/1605 700/245 |
| 2017/0153614 | A1 | 6/2017 | Namie |
| 2018/0267486 | A1 | 9/2018 | Manabe |
| 2019/0118384 | A1* | 4/2019 | Dalibard .............. B25J 19/0008 |
| 2020/0264571 | A1 | 8/2020 | Egi |

FOREIGN PATENT DOCUMENTS

| | | |
|---|---|---|
| CN | 105103437 A | 11/2015 |
| CN | 106909074 A | 6/2017 |
| CN | 107797447 A | 3/2018 |
| JP | 2003241836 A | 8/2003 |
| JP | 2007076807 A | 3/2007 |
| JP | 2011186878 A | 9/2011 |
| JP | 2016198873 A | 12/2016 |
| JP | 2017102617 A | 6/2017 |
| JP | 2018151899 A | 9/2018 |
| JP | 2019109598 A | 7/2019 |
| JP | 2019136817 A | 8/2019 |
| WO | WO-2019002587 A1 * | 1/2019 |

OTHER PUBLICATIONS

International Search Report issued in Intl. Appln. No. PCT/JP2020/000749 mailed Mar. 10, 2020. English translation provided.

Written Opinion issued in Intl. Appln. No. PCT/JP2020/000749 mailed Mar. 10, 2020. English translation provided.

Sakurai. "Offset Compensation of Continuous Time Model Predictive Control by Disturbance Estimation." Journal of Society of Systems Control and Information Science. 2012: 10-18. vol. 25, No. 7. English abstract provided.

Ohtsuka. "A continuation/GMRES method for fast computation of nonlinear receding horizon control." Automatica. 2004: 563-574. vol. 40.

Office Action issued in Chinese Appln. No. 202080007728.0, mailed on Nov. 30, 2023. English translation provided.

Maeder et al. "Linear offset-free Model Predictive Control." Automatica. 2009: 2214-2222. vol. 45.

\* cited by examiner (a)

(b)

(a)

(b)

(a)

(b)

(a)

(b)

PROGRAMMABLE LOGIC CONTROLLER THAT SUPPLIES A TARGET COMMAND TO CONTROL A TARGET DEVICE

TECHNICAL FIELD

The present invention relates to a control device that supplies a target command for causing a target device to follow a predetermined command.

BACKGROUND ART

Feedback control is typically used to move a target device along a command trajectory. For example, some multi-joint robots have a robot control device that controls servomotors of individual joint axes in such a way that their fingertips trace a preset (taught) command trajectory under feedback control. Under typical feedback control, an actual trajectory of a robot prone to deviate from a command trajectory because response delays inevitably occur in each servomotor. To reduce the deviation from the command trajectory, some robot control devices employ a technique concerned with model predictive control (e.g., see Non-Patent Document 1).

When a target device is moving along a command trajectory, if an obstacle that may interfere with the movement of the target device is present, the control device needs to control the target device so as to avoid the collision with the obstacle. For example, Patent Document 1 discloses a technique for forming a probabilistic potential field based on an existence probability of an obstacle around the target device and then determining a route along which the target device is to travel based on the gradient of the probabilistic potential field. Patent Document 2 discloses vehicle collision avoidance control that also utilizes a probabilistic potential field based on an existence probability of an obstacle.

PRIOR ART DOCUMENTS

Patent Documents

Patent Document 1: Japanese Unexamined Patent Publication No. 2003-241836
Patent Document 2: Japanese Unexamined Patent Publication No. 2011-186878

Non-Patent Documents

Non-Patent Document 1: offset compensation of continuous time model predictive control by disturbance estimation, written by Yuta Sakurai and Toshiyuki Ohtsuka, in Journal of Society of Systems Control and Information Science, Vol. 25 No, 7, pp. 10-18 (2012)

SUMMARY OF THE INVENTION

Problems to be Solved by the Invention

In conventional techniques, when using the model predictive control to cause an output of a target device to be servo-controlled to follow a predetermined command, a control device sets a predictive model used for this model predictive control, based on generalized coordinates, such as joint coordinates of a drive motor on one or more of control axes of the target device. It is possible to easily set the predictive model of the target device based on the generalized coordinates; however, it is doubtful whether the trajectory traced by the output of the target device is always optimized. This is because the model predictive control is optimized with reference to the generalized coordinates. In short, the output of the target device, which is typically defined based on a generalized coordinate system set for the entire target device, may vary complicatedly depending on a geometrical relationship of the machine structure which is related to drive motors of control axes and the control axes.

Another conceivable technique employs both a state quantity of a working coordinate system of a target device and a state quantity of a generalized coordinate system in a predictive model and expresses a Jacobian matrix so as to contain parameters of generalized coordinates. However, the Jacobian matrix does not provide a correlation between a position and an angle. Thus, an error increases with the progress of the servo control, advantageously lowering the follow-up capacity of the output of the target device.

The present invention, which has been made in view of such disadvantages, aims to provide a technique for causing an output of a target device to appropriately follow a predetermined command under model predictive control.

Means for Solving the Problem

In the present invention, a control device, which addresses disadvantages as described above, supplies a target device with a command for causing an output of the target device to follow a predetermined command. This control device employs the following configuration: a model predictive control using a predictive model is performed in accordance with a predetermined working coordinate system related to the target device; and a target command supplied to the target device is calculated, as a target command in a generalized coordinate system, by using inverse kinematics of the controlled object and based on an output obtained from the model predictive control. Consequently, it is possible to appropriately enhance a capacity to follow a predetermined command.

More specifically, the present invention is a control device that causes an output of a target device to be servo-controlled to follow a predetermined command in a predetermined working coordinate system. This target device has one or more control axes. An independent generalized coordinate system is set for each of the one or more control axes and is used to servo-control each of the one or more control axes. The control device includes a target model controller, a state acquisition unit, a model predictive controller, a calculator, and a supply unit. The target model controller possesses a target model in which the target device is modeled based on the predetermined working coordinate system and is configured to simulate an output according to the predetermined working coordinate system by using the target model and to output a simulation result. The state acquisition unit is configured to acquire a value of a predetermined state variable based on the predetermined working coordinate system, the predetermined state variable being related to the target model possessed by the target model controller. The model predictive controller possesses a predictive model in which a correlation between the predetermined state variable and a control input to the target model controller is defined in a form of a predetermined state equation based on the predetermined working coordinate system. This model predictive controller is configured to receive the predetermined command, to perform the model predictive control within a predictive zone having a predetermined time width in accordance with a predetermined evaluation function and based on the predictive model, and to output a value of the control input at least at an initial time of the predictive zone, as the control input to the target model controller, the control input being related to the predetermined command. The calculator is configured to calculate a target command for each control axis from the output of the target model controller which is based on the predetermined working coordinate system, the output of the target model controller being obtained by inputting an output of the model predictive controller to the target model, the target command according to a geometric relationship of a machine structure related to the one or more control axes in the target device and being based on the generalized coordinate system set for each of the one or more control axes. The supply unit is configured to supply the target command to each of the one or more control axes to the target device.

The control device of the present invention is a control device that supplies a target command for causing an output of a target device to follow a predetermined command. This control device includes a target model controller that possesses a target model in which the target device is modeled. The target device is a device having one or more control axes, which are related to one another on the assumption that the device has a machine configuration, thereby obtaining an output of the target device itself. In this case, the output of the target device itself is defined by a predetermined working coordinate system assumed for the entire target device in consideration of the relationship of the one or more control axes. On the other hand, an independent generalized coordinate system for servo-controlling the control axis is set for each of the one or more control axes, which constitute the target device. If each control axis includes a rotatably-driven actuator, a rotating coordinate system related to a rotation angle of each control axis (may be a joint coordinate system if the target device is a robot) can be used as an example of the generalized coordinate system.

The target model controller performs a simulation process on the target device by using the target model. Then, the model predictive controller is configured to perform model predictive control by using a predictive model that defines a correlation between a predetermined state variable related to the target model controller and a control input to the target model controller. In this case, the model predictive controller sets a predictive zone having a predetermined time width at each control time under the model predictive control. Then, the model predictive controller performs a predetermined calculation process in accordance with a predetermined evaluation function in the predictive zone. After that, the model predictive controller generates and outputs a control input value calculated at least the initial time in the predictive zone in real time. The target model controller receives the generated output and performs the above simulation process. In this model predictive control, the predictive zone moves with the passage of the control time, and so-called receding horizon control is performed. This configuration can generate a control input for following a predetermined command in real time and output this control input to the target device.

The above control device defines the predictive model for the model predictive control, based on the predetermined working coordinate system related to the target device. Therefore, the optimization in the model predictive control in accordance with the predetermined evaluation function is performed based on the predetermined working coordinate system. As a result, it is possible to easily cause the output of the target device to follow the predetermined command. On the other hand, since the model predictive control is performed in accordance with a predetermined working coordinate system, it is impossible to apply, as a command value, a signal obtained through a simulation process performed by the target model controller that has received the output of the model predictive controller, that is, the output of the target model controller to the one or more control axes constituting the target device without using any process. For this reason, the calculator performs a calculation process of converting the output of the target model controller into the target command of each control axis based on the generalized coordinate system. This calculation process is performed in accordance with the geometrical relationship of the machine structure related to each control axis in the target device. Therefore, it is possible to appropriately avoid an occurrence of an output error (positional error) of the target device which may be caused by accumulation of calculation errors, thus appropriately providing the target device with a capacity to follow a predetermined command.

After having calculated the target command for each of the one or more control axes in the above manner, the calculator supplies this target command to the target device via the supply unit. The target command is supplied to each control axis and is appropriately applied to a device such as a servo driver. As a result, each control axis can be appropriately servo-controlled in accordance with a servo control structure, for example, provided therein.

The above control device may set each of the predictive model and the target model to a one-inertia model related to a coordinate axis in the predetermined working coordinate system. More specifically, in the simulation using the target model through which the calculator finally converts the output of the target model controller into a target command for each control axis, the geometric (structural) relationship between the control axes in the actual target device is eliminated, and both the predictive model and the target model are set on the assumption that each control axis is independent. Forming both the predictive model and the target model in this manner can lighten a process load related to the model predictive control, thus sufficiently ensuring a follow-up capacity of the target device. Employing this configuration may make the predictive model differ from the actual configuration of the target device, lowering an accuracy of optimization under the model predictive control, but does not greatly affect actual driving of the control device because the supply unit supplies the target command (target trajectory). As a result, a disadvantage to the lowered accuracy of optimization can be greatly minor in consideration of an advantage obtained from the above lightened process load.

In the above control device, when obtaining, as the target command, a predetermined complex number solution containing an imaginary number from the output of the target model controller in accordance with the geometric relationship of the machine structure, the calculator may calculate a real part of the predetermined complex number solution as the target command. The reason why the calculator obtains a predetermined complex number solution through the calculation process is that the calculator performs the calculation process in accordance with the machine structure of the target device after the output of the target device has been optimized in a predetermined working coordinate system, in the invention of the present application. When the calculator obtains a predetermined complex number solution, the machine structure of the target device is rate-determining. Thus, the calculator cannot physically realize the output of the target model controller that has received the output of the model predictive controller. In this case, as described above, the calculator tentatively calculates the real part of the predetermined complex number solution as the target command, thereby successfully continuing to supply the target command to the target device.

The above control device may further include an integrator configured to receive a deviation between the predetermined command and the output of the target model controller. Moreover, the model predictive controller may perform the model predictive control by receiving an output of the integrator that has received the deviation. The predictive model may contain a predetermined integration term expressed by a product of the deviation between the output of the target model controller and the predetermined command and a predetermined integrated gain. Employing this configuration performs the model predictive control based on the deviation. Consequently, it is possible to effectively eliminate a steady-state deviation without unnecessarily deteriorating a follow-up transient response to a predetermined command. Furthermore, the above control device aims to eliminate a steady-state deviation by containing a predetermined integration term in the predictive model. Thus, this control device can greatly lighten a load required for designing the control system, thereby appropriately follow-up-controlling the target device. When an observer that estimates a disturbance that may cause a steady deviation is used as in the prior art, it is difficult to design the parameters, generating a relatively heavy calculation load. From the point of this viewpoint, the above configuration of the present invention is also effective.

In the above control device, when a value of the deviation is contained in a predetermined first range including zero, the predetermined integrated gain may be adjusted to increase as the deviation decreases. When the value of the deviation is not contained in the predetermined first range, the predetermined integrated gain may be set to zero. As a result, when the deviation increases, that is, when the output of the target device largely deviates from the predetermined command, the predetermined integrated gain is adjusted to be a smaller value so that the integral amount in the model predictive control is not excessively accumulated. When the deviation decreases, the predetermined integrated gain is adjusted to a large value so that the servo control based on the integrated amount is promoted in the model predictive control. The control device performs the servo control based on the integrated amount in the model predictive control which involves the adjustment of the predetermined integrated gain only when a value of the deviation is contained in the predetermined first range. This can appropriately suppress an overshoot during a transient response. The predetermined first range may be set to an appropriate value, for example, in consideration of a capacity to follow a predetermined command and an allowable overshoot amount during the servo control.

The above control device may further include an acquisition unit configured to acquire a position of an obstacle relative to the target device. A stage cost calculated from the predetermined evaluation function may contain a state quantity cost that is a stage cost related to the predetermined state variable, a control input cost that is a stage cost related to the control input, and an obstacle stage cost related to a probabilistic potential field that represents a probability that an obstacle is present around the target device and that is calculated based on a predetermined evaluation position. When the target device and the obstacle are in a proximity state where one of the target device and the obstacle is contained in a predetermined proximity region centered on the other of the target device and the obstacle, the model predictive controller may generate the obstacle stage cost to perform the model predictive control. When the target device and the obstacle are not in the proximity state, the model predictive controller may perform the model predictive control without generating the obstacle stage cost.

When the target device is following a predetermined command, if an obstacle is present near the target device, the control device needs to cause the target device to follow this command and simultaneously to appropriately avoid a collision with the obstacle. For this purpose, the control device uses the acquisition unit to obtain the position of the obstacle. After having known the position of the obstacle, the model predictive controller contains the obstacle stage cost related to the obstacle in the stage cost calculated by the predetermined evaluation function for the model predictive control, in addition to both the state quantity cost and the control input cost. In this way, it is possible to activate a probabilistic potential field in the correlation with the obstacle during the model predictive control for following a predetermined command. The control device generates the obstacle stage cost in order to activate the probabilistic potential field only when the target device and the obstacle are in a proximity state. As a result, a repulsive force (an action of moving the target device away) formed by the probabilistic potential field of the obstacle acts on the target device, so that it is possible to cause the target device to avoid the obstacle and to control the deterioration of the follow-up capacity of the target device by preventing the repulsive force from unnecessarily acting on the target device.

In the above control device, a first potential field that represents a probability that the obstacle is present around the target device may be set for the target device so as to conform to a shape of a predetermined part of the target device including an output part of the target device and so as to surround the predetermined part. The second potential field that represents a probability that the target device is present around the obstacle may be set for the obstacle so as to conform to a shape of the obstacle and so as to at least partly surround the obstacle. When the first potential field at least partially overlaps the second potential field, the model predictive controller may determine that the target device and the obstacle are in the proximity state, may set the probabilistic potential field to each of the first potential field and the second potential field calculated based on the at least one predetermined evaluation position contained in an overlapping region of the first potential field and the second potential field, and may generate the obstacle stage cost to perform the model predictive control. When the first potential field does not overlap the second potential field at all, the model predictive controller may determine that the target device and the obstacle are not in the proximity state and may perform the model predictive control without generating the obstacle stage cost. In the disclosure of the present application, as an example, when set in a two-dimensional fashion, each of the first potential field and the second potential field may have a circular or elliptical shape. When set in a three-dimensional fashion, each of the first potential field and the second potential field may have a circular or ellipsoidal stereoscopic shape. Setting each potential field in a circular or elliptical shape in this manner eases the determination whether the two potential fields overlap each other in terms of calculation.

Setting corresponding potential fields having elliptical shapes for the target device and the obstacle in this manner can set potential fields in accordance with the shapes of the target device and the obstacle. Therefore, it is possible to suppress the target device from being unnecessarily largely displaced in order to avoid an obstacle. In addition, the obstacle stage cost is generated based on a predetermined evaluation position within an overlapping region in which the first potential field at least partially overlaps the second potential field. This can appropriately generate a repulsive force for avoiding a collision with the obstacle.

Depending on the relative positional relationship between the target device and the obstacle, the target device may enter a deadlock state in which it is not displaced smoothly during the servo control related to following of a predetermined command. When in the deadlock state, the target device may substantially fail to follow the predetermined command; therefore, the control device preferably swiftly escapes from the deadlock state. For this reason, the control device may further include a detector configured to detect that the target device is in a deadlock state.

When the detector detects the deadlock state, one or both of the first potential field and the second potential field may be deformed. Then, the model predictive controller may perform the model predictive control based on an overlapping relationship between the deformed first potential field and second potential field. Alternatively, when the detector detects the deadlock state, one or more new potential fields may be added to at least one of the target device and the obstacle, the one or more new potential fields differing from the first potential field or the second potential field. Then, the model predictive controller may perform the model predictive control based on an overlapping relationship between a new first potential field for the target device and a new second potential field for the obstacle, some or all of the one or more new potential field being added to the new first potential field, the remaining one or ones of the one or more new potential field being added to the new second potential field. Adjusting the potential fields set for the target device and the obstacle before and after the target device is in the deadlock state can expectedly release the deadlock state.

In the control device, the model predictive controller may be configured to repeatedly execute a predetermined operation in accordance with the predetermined evaluation function to obtain the output of the model predictive controller during the model predictive control. In this case, when the number of times that the model predictive controller repeatedly executes a predetermined operation to obtain one output of the model predictive controller in the model predictive control exceeds a reference number of times, the detector may detect that the target device is in the deadlock state. The fact that the number of predetermined operations exceeds the reference number means that the control input optimized in accordance with the predetermined evaluation function is not promptly derived in the model predictive control. In this case, it is reasonably determined that the target device is in the deadlock state.

As another method, in the control device, when the target device and the obstacle are in the proximity state, in a case where the calculator obtains, as the target command, a predetermined complex number solution containing an imaginary number from the output of the target model controller in accordance with the geometric relationship of the machine structure, the detector may detect that the target device is placed in the deadlock state. The fact that the calculator obtains a predetermined complex number solution when the target device and the obstacle are in the proximity state means that the target device fails to sufficiently follow the predetermined command due to the geometric relationship of the machine structure. In this case, it is reasonably determined that the target device is placed in the deadlock state.

Effect of the Invention

The model predictive control enables the supply of a target command for causing an output of a target device to appropriately follow a predetermined command.

MODE FOR CARRYING OUT THE INVENTION

Application Example

Figure 1:
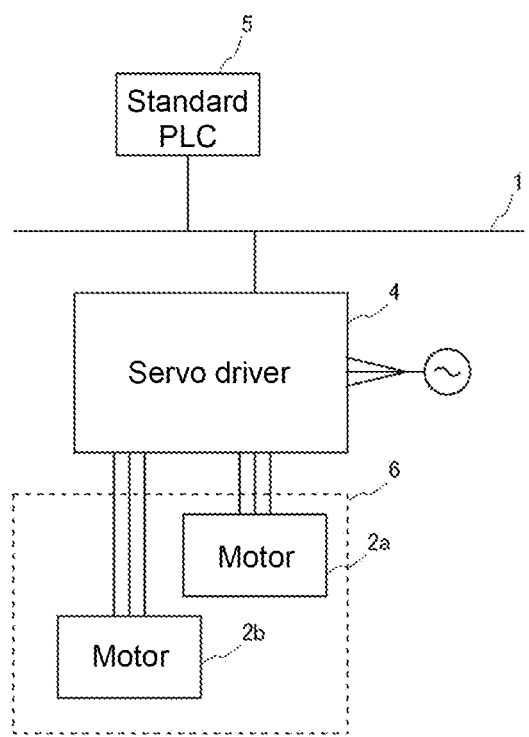
FIG. 1(a) is a diagram of a schematic configuration of a control system including a standard PLC acting as a control device.
FIG. 1(b) is a schematic configuration of a robot arm to be servo-controlled by the control system.
Figure 1:
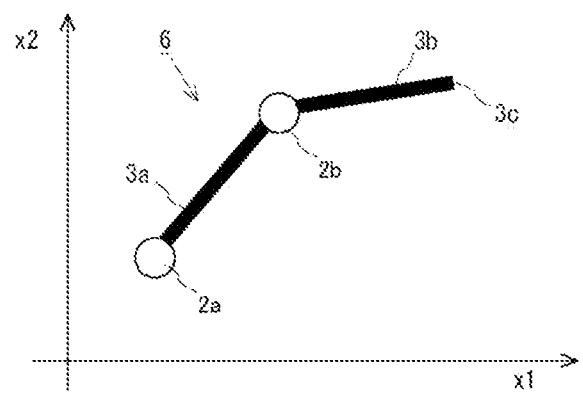

Some application examples of a control device according to an embodiment will be described with reference to FIGS. 1(a) to 3. FIG. 1(a) is a schematic configuration diagram of the control system. This control system includes a network 1, a servo driver 4, and a standard programmable logic controller (PLC) 5. The servo driver 4 is a servo control device that servo-controls a robot arm 6 having two motors 2a and 2b related to two control axes (joints). The control system illustrated in FIG. 1 is configured such that a single servo driver 4 can drive two control axes (motors). Instead of this configuration, the control system may employ a configuration in which servo drivers 4 are disposed for respective control axes and connected together by the network 1. The standard PLC 5 supplies a target command to the servo driver 4 in order to drive and control the robot arm 6. Herein, the robot arm 6 corresponds to a target device, and the standard PLC 5 corresponds to a control device.

In the above control system, the servo driver 4 feedback-controls the robot arm 6 by using a target command supplied from the standard PLC 5 in such a way that an output of the robot arm 6 follows a predetermined command. After having been supplied with the target command, the servo driver 4 receives feedback signals output from encoders connected to the motors 2a and 2b and supplies drive currents to motors 2a and 2b so that the output of the robot arm 6 follows the predetermined command. Each of these supply currents may be generated from alternating current (AC) power that an AC power supply supplies to the servo driver 4. In this embodiment, the servo driver 4 may be of a type that receives a three-phase alternating current; however, it may be of a type that receives single-phase alternating current. In this application, the form of the feedback control performed by the servo driver 4 is not limited to a specific one. Since a configuration of the servo driver 4 is not a core of the present invention, a detailed disclosure thereof will not be described.

FIG. 1(b) discloses a schematic configuration of the robot arm 6. In the robot arm 6, one end of a first arm 3a is coupled to an output shaft of the motor 2a so that the motor 2a acts as a first joint that rotationally drives the first arm 3a. The motor 2b is disposed at the other end of the first arm 3a, and one end of a second arm 3b is coupled to an output shaft of the motor 2b so that the motor 2b acts as a second joint that rotationally drives the second arm 3b. The second arm 3b has an end 3c which acts as an output portion of the robot arm 6 and to which, for example, an end effector that grips a predetermined object is attached. In the robot arm 6, rotational planes formed by the first arm 3a and the second arm 3b are on the same level. To define the rotational planes, axes x1 and x2 are set as orthogonal coordinates. These orthogonal coordinates correspond to working coordinates related to the robot arm 6, on which a position of the end 3c of the robot arm 6 is defined.

Each of the motors 2a and 2b disposed into the robot arm 6 may be an AC servomotor, for example. The motors 2a and 2b are provided with the encoders (not illustrated), which transmit and feed back parameter signals (position signals) related to the operations of the motors 2a and 2b to the servo driver 4; the parameter signals are used for feedback control there.

Figure 2:
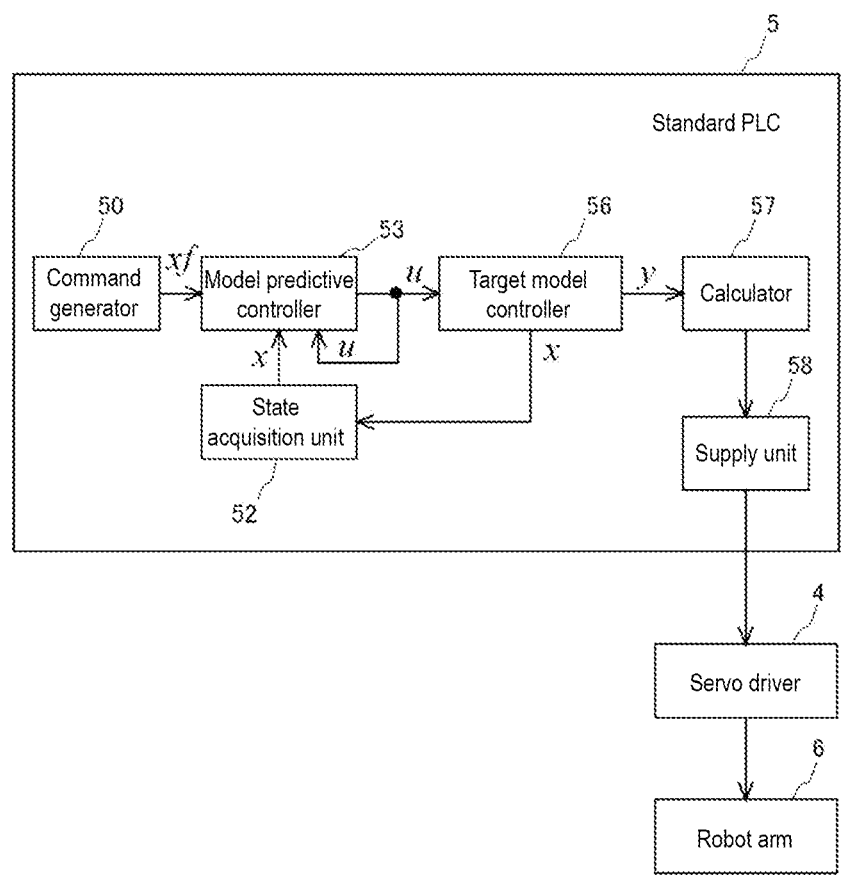
FIG. 2 is a first diagram mainly illustrating a control structure of the standard PLC in an embodiment.

Based on FIG. 2, a control structure of the standard PLC 5 will be described. The standard PLC 5 generates a target command regarding the movement of the robot arm 6 and supplies this target command to the servo driver 4. The standard PLC 5 includes functional units: a command generator 50, a state acquisition unit 52, a model predictive controller 53, a target model controller 56, a calculator 57, and a supply unit 58. These functional units calculate and perform individual processes with an arithmetic processing unit mounted in the standard PLC 5. In the control structure illustrated in FIG. 2, the command generator 50 generates a predetermined command denoted by xf; the target model controller 56 receives a control input denoted by u.

The command generator 50 generates the predetermined command xf to be followed by the end 3c of the robot arm 6. The command xf is based on the working coordinate system (see FIG. 1(b)) related to the robot arm 6 and is used for model predictive control performed by the model predictive controller 53 described later. The target model controller 56 has a target model with an inertia corresponding to a predictive model in which the robot arm 6 is modeled and uses this target model to simulate an output (the position of the end 3c, etc.) of the robot arm 6. Then, the target model controller 56 outputs the simulation result denoted by y. The target model controller 56 transmits the output y to the calculator 57, which will be described later.

The state acquisition unit 52 and the model predictive controller 53 will be described. The state acquisition unit 52 obtains a state variable, which is contained in a state x associated with a target model (a target model possessed by the target model controller 56) related to the robot arm 6; the state variable is used for the model predictive control performed by the model predictive controller 53. This target model is based on a one-inertia model in a working coordinate system (a two-dimensional working coordinate system in the example illustrated in FIG. 1(b)) related to the movement of the robot arm 6. (However, if the robot arm 6 moves in a three-dimensional manner, the working coordinate system is a three-dimensional working coordinate system.) This state variable is based on the working coordinate system (see FIG. 1(b)) related to the robot arm 6. Then, the model predictive controller 53 uses the state x related to the robot arm 6 which the state acquisition unit 52 has acquired and the control input u which the model predictive controller 53 itself has output to the target model controller 56, to perform the model predictive control (receding horizon control).

More specifically, the model predictive controller 53 has a predictive model in which the correlation between the state x related to the target model and the control input u to the robot arm 6 is defined by the following state equation (Equation 1). Similar to the above target model, the predictive model expressed in Equation 1 below does not faithfully reflect predetermined physical characteristics of the robot arm 6. In fact, the predictive model is a one-inertia model set on the assumption that the robot arm 6 has a one-inertia system related to each of the axes x1 and the x2 based on the above working coordinate system. In short, this one-inertia model can be obtained by eliminating the geometrical (structural) relationship between the first joint and the second joint in the robot arm 6 and setting an appropriate single mass representing the robot arm 6 to be driven on each of axes that define the working coordinate system. Herein, the appropriate mass may be the overall mass of the robot arm 6 itself or may be set to a mass slightly greater than the overall mass of the robot arm 6 in order to avoid saturation of an operation amount of the robot arm 6 during the servo control. Setting a one-inertia model related to the working coordinate axis in each of the target model and the predictive model in this manner can lighten a process load related to the model predictive control for generating a target trajectory of the robot arm 6.

$$\dot{x}(t) = P(x(t), u(t)) = \begin{bmatrix} \dot{x}_1 \\ \dot{x}_2 \\ \dfrac{\ddot{x}_1}{M} \\ \dfrac{\ddot{x}_2}{M} \end{bmatrix} \qquad [\text{Equation 1}]$$

In Equation 1, M denotes the overall mass of the robot arm 6, which corresponds to the "appropriate mass" described above.

The model predictive controller 53 receives the state x related to the target model and the control input u to the robot arm 6 and then performs the model predictive control within the predictive zone having a predetermined time width T, based on the predictive model expressed in Equation 1 and in accordance with the evaluation function expressed in Equation 2 below.

$$J = \varphi(x(t+T)) + \int_{t}^{\tau+T} L(x(\tau), u(\tau))d\tau \qquad [\text{Equation 2}]$$

The first term on the right side of Equation 2 above is a terminal cost, whereas the second term on the right side is a stage cost. This stage cost can be expressed in Equation 3 below.

$$L = \frac{1}{2}\left((xref - x)^T(k)Q(xref - x)(k) + (uref - u)^T(k)R(uref - u)(k)\right) \quad \text{[Equation 3]}$$

where xref(k) denotes a target state quantity at a time k, x(k) denotes a calculated state quantity at the time k, uref(k) denotes steady-state target control input at the time k, and u(k) denotes computational control input at the time k. Furthermore, Q denotes a coefficient (weight coefficient) that represents the weight of the state quantity in the stage cost, and R denotes a coefficient (weight coefficient) that represents the weight of the control input. Therefore, the first term on the right side of Equation 3 represents the stage cost, called "state quantity cost", related to the state quantity, and the second term on the right side represents the stage cost, called "control input cost", related to the control input.

The model predictive controller 53 outputs the value of the control input u at the initial time t within the predictive zone which is calculated under the model predictive control based on the above, as the control input u to the target model controller 56 corresponding to the command xf at the time t. Under the model predictive control, the model predictive controller 53 sets a predictive zone having a predetermined time width T at every control time. Then, the model predictive controller 53 calculates the control input u to be supplied to the target model controller 56 at every control time in accordance with the evaluation function of Equation 2 and then transmits the control input u to the target model controller 56. A question as to how to determine the operation amount by which the value of the evaluation function J as in the form of Equation 2 is optimized is a question widely known as an optimal control problem. An algorithm for calculating the numerical solution is disclosed as a known technique, One example of such techniques is a continuous transformation method, details of which is disclosed in, for example, the known document titled "a continuation/GM-RES method for fast computation of nonlinear receding horizon control", written by Toshiyuki Otsuka, in Automatica, Vol. 40, p 563-574, 2004).

In the continuous transformation method, the input U a) in the model predictive control is calculated by solving the simultaneous linear equation related to the input U (t) which is expressed in Equation 4 below. More specifically, Equation 4 is solved, and dU/dt is numerically integrated, so that the input U (t) is updated. In the continuous transformation method, as described above, the iterative calculation is not performed; therefore, the calculation load for calculating the input U (t) at each time can be reduced promptly.

$$\frac{\partial F}{\partial U}\dot{U} = -\zeta F - \frac{\partial F}{\partial x}\dot{x} - \frac{\partial F}{\partial t} \quad \text{[Equation 4]}$$

where F and U (t) are expressed by Equation 5 below.

$$F(U(t), t) = \begin{bmatrix} \frac{\partial H}{\partial u}(x_0^*(t), u_0^*(t), \lambda_1^*(t), \mu_0^*(t)) \\ C(x_0^*(t), u_0^*(t)) \\ \vdots \\ \frac{\partial H}{\partial u}(x_{N\_1}^*(t), u_{N\_1}^*(t), \lambda_{N\_1}^*(t), \mu_{N\_1}^*(t)) \\ C(x_{N\_1}^*(t), u_{N\_1}^*(t)) \end{bmatrix} \quad \text{[Equation 5]}$$

$$U(t) = \left[u_0^{*T}(t), \mu_0^{*T}(t), \ldots, u_{N\_1}^{*T}(t), \mu_{N\_1}^{*T}(t)\right]$$

where H denotes Hamiltonian, λ denotes a co-state, and μ denotes the Lagrange multiplier with the constraint C=0.

Next, the calculator 57 will be described. Receiving the control input u, the target model controller 56 generates an output y based on the working coordinate system illustrated in FIG. 1(b). On the other hand, the motors 2a and 2b, which constitute the robot arm 6, are rotationally driven actuators. For each motor, a rotating coordinate system, which is an independent coordinate system different from the working coordinate system, is set such that the servo driver 4 performs the servo control. Thus, the output y itself cannot be used as a target command for driving the motors 2a and 2b. For this reason, the calculator 57 performs a calculation process for converting the output y of the target model controller 56 into a target command based on the rotating coordinate system for each motor.

Figure 3:
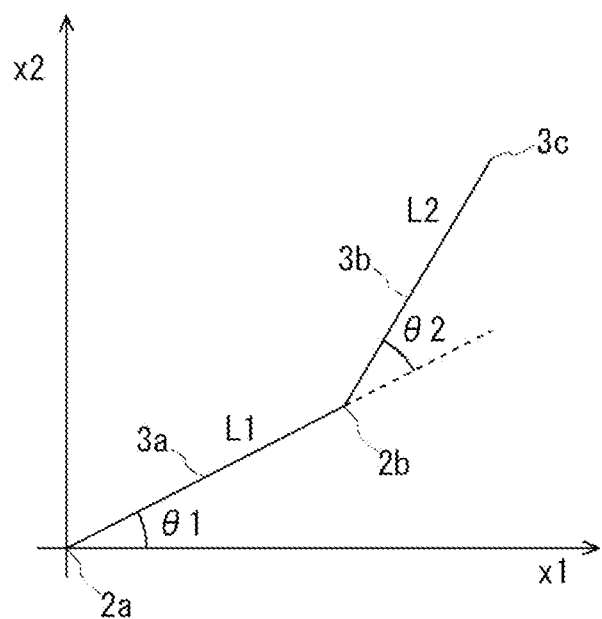
FIG. 3 is an explanatory diagram of a geometrical relationship of a machine structure of a robot arm.

The calculator 57 performs the calculation process in accordance with the geometrical relationship of the machine structure of the robot arm 6. FIG. 3 illustrates the machine structure of the robot arm 6. In FIG. 3, it should be noted that the first joint at which the motor 2a is disposed is positioned at the origin of the working coordinate system, for the sake of simple explanation. When the geometrical relationship of the machine structure of the robot arm 6 is considered under the condition of the length of the first arm 3a being denoted by L1 the length of the second arm 3b being denoted by L2, and the position of the end 3c being denoted by ($x_1$, $x_2$), rotation angles θ1 and θ2 of the motors 2a and 2b can be expressed in Equation 6 below. The rotation angle θ1 of the motor 2a is defined as the angle between the axis x1 and the first arm 3a, whereas the rotation angle θ2 of the motor 2b is defined as the angle between the first arm 3a and the second arm 3b.

[Equation 6]

$$\theta_2 = \text{atan2}\left(\frac{\pm\sqrt{(2L_1L_2)^2 - \{L_0^2 - (L_1^2 + L_2^2)\}^2}}{2L_1L_2}, \frac{L_0^2 - (L_1^2 + L_2^2)}{2L_1L_2}\right),$$

where $L_0^2 = x_1^2 + x_2^2$ $$\theta_1 = \text{atan2}\left(\frac{-k_S x_1 + k_C x_2}{k_C^2 + k_S^2}, \frac{k_C x_1 + k_S x_2}{k_C^2 + k_S^2}\right),$$

where $$k_C = L_1 + L_2\cos\theta_2$$

$$k_S = L_2\sin\theta_2$$

In Equation 6, the function a tan 2 is a function by which the argument of (x, y) in the cartesian coordinate system is returned when the function is expressed by a tan 2 (x, y).

In the above way, θ1 and θ2 that the calculator 57 calculates from the output y of the target model controller 56 are target commands regarding the positions (angles) of the respective motors and are suitable for the servo control of the motors 2*a* and 2*b*. Therefore, the calculator 57 supplies the calculation result to the servo driver 4 via the supply unit 58; this calculation result is used for the servo control (feedback control) there. In the control system of this embodiment, as described above, the standard PLC 5 performs the model predictive control, based on the working coordinate system related to the robot arm 6. Consequently, the output of the robot arm 6 can easily and appropriately follow a predetermined command xf that is also based on the working coordinate system. Furthermore, the calculator 57 performs the above calculation process through which the result of the model predictive control based on the working coordinate system is converted into target commands appropriately applicable to the servo control of the motors 2*a* and 2*b* based on the rotating coordinate system. In this case, the calculation process is based on the geometrical relationship of the machine structure of the robot arm 6. Thus, this calculation process can appropriately avoid an occurrence of an output error (positional error) of the robot arm 6 which may be caused by accumulation of calculation errors. This feature is significantly effective in terms of a follow-up capacity of the robot arm 6.

First Configuration Example

Figure 4:
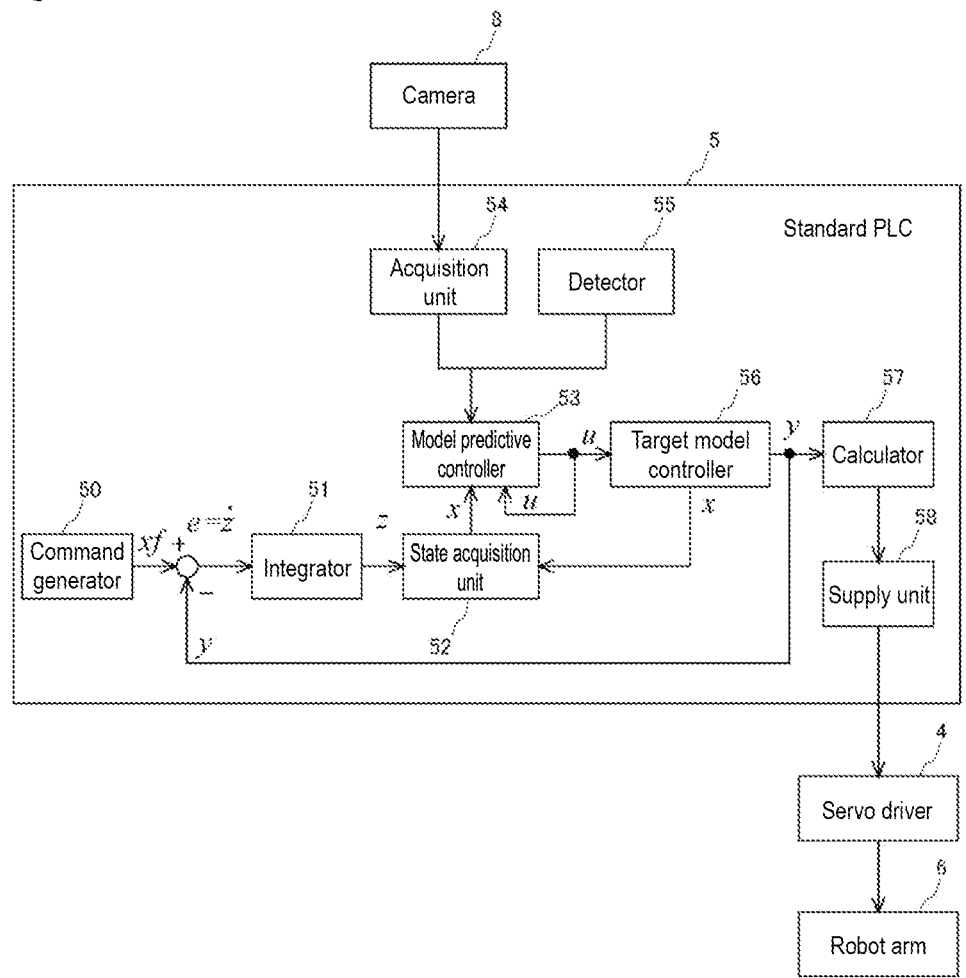
FIG. 4 is a second diagram mainly illustrating the control structure of the standard PLC in the embodiment.

A control structure of a standard PLC 5 according to this configuration example will be described with reference to FIG. 4. The standard PLC 5 in this configuration example is similar to that in the above application example in including a model predictive controller 53 that performs model predictive control. In this case, however, a state acquisition unit 52 obtains an output z of the integrator 51 and uses the output z for the model predictive control. More specifically, an integrator 51 receives a predetermined command xf from a command generator 50 and also receives an output y of a target model controller 56 which is fed back by a feedback system and then supplies a deviation e(e=xf−y) between the command xf and the output y. Then, the integrator 51 transmits the output z to the model predictive controller 53 via the state acquisition unit 52. In this way, the state acquisition unit 52 adds the output z to the above state variable related to the robot arm 6; this state variable is used for the model predictive control performed by the model predictive controller 53.

In consideration of the control structure including the integrator 51, the predictive model possessed by the model predictive controller 53 in this configuration can be represented in, for example, Equation 7 below.

$$\dot{x}(t) = P(x(t), u(t)) = \begin{bmatrix} \dot{x}_1 \\ \dot{x}_2 \\ \dfrac{\ddot{x}_1}{M} \\ \dfrac{\ddot{x}_2}{M} \\ (x_{f1} - x_1)K_i \\ (x_{f2} - x_2)K_i \end{bmatrix} \quad [\text{Equation 7}]$$

In Equation 7, xf1 and xf2 denote the target positions on the axes x1 and x2 in the working coordinate system.

In Equation 7, (Xf y) represents the deviation e. It can be understood that the above predictive model contains an integral term represented by the product of the deviation e (Xf−y) and the integrated gain $K_i$. The integrated gain $K_i$ corresponds to a predetermined integrated gain. Using this equation can easily adjust an integral amount related to a follow-up capacity suitable for the predetermined command xf described in the application example in a process that the standard PLC 5 performs by using the model predictive control. Thus, it is possible to easily improve a capacity to follow the predetermined command xf with overshoot reduced and without using a conventional disturbance observer that requires difficult adjustment, such as an expansion of a disturbance model or design of an observer gain.

The integrated gain $K_i$ of the integral term contained in the predictive model expressed in Equation 7 can be adjusted based on the deviation e. More specifically, the integrated gain $K_i$ is adjusted such that its value increases as the magnitude of the deviation e decreases. For example, when the magnitude of the deviation e is equal to or greater than a predetermined e0, the integrated gain $K_i$ is set to zero. When the magnitude of the integrated gain $K_i$ is in the range below e0, the integrated gain $K_i$ is set to a value greater than zero and less than one. Furthermore, as the magnitude of the deviation e approaches zero, the transition of the integrated gain $K_i$ may be set such that the value of the integrated gain $K_i$ approaches one sharply. When the magnitude of the deviation e becomes zero, the transition of the integrated gain $K_i$ may be set such that the integrated gain $K_i$ becomes 1. In this way, the integrated gain Ki is adjusted based on the magnitude of the deviation e. Thus, when the output y of the target model controller 56 is relatively different from the command xf, the value of the integrated gain $K_i$ is adjusted to be a small value. Consequently, the adjustment is made such that the integrated amount for improving the follow-up capacity is not inadvertently accumulated. When the deviation amount between the output y of the target model controller 56 and the command xf decreases, that is, when the magnitude of the deviation e decreases, the value of the integrated gain $K_i$ is greatly adjusted, so that the follow-up capacity of the robot arm 6 is effectively improved.

Another aspect of how to adjust the integrated gain $K_i$ will be described. In this aspect, the integrated gain $K_i$ is also adjusted so that the value of the integrated gain $K_i$ increases as the magnitude of the deviation e decreases. However, the integration process using the integrated gain $K_i$ is performed only when a predetermined condition is satisfied.

In this embodiment, as the above predetermined condition, when the value of the deviation e falls within a predetermined first range including zero, the integrated gain $K_i$ is adjusted, and in accordance with the adjusted integrated gain $K_i$, the integration process is performed. When the value of the deviation e falls outside the predetermined first range, the integrated gain $K_i$ is set to zero, in which case the integration process is not substantially performed. As an example, when the output of the target model controller 56 is in a two-dimensional form, the predetermined first range can be defined as a downwardly convex function f(x). In this case, the above integrated gain $K_i$ is set in the following manner so that the adjustment of the integrated gain $K_i$ is achieved:

$$K_i = \alpha(|f(x)| - f(x)),$$

where α denotes a predetermined coefficient.

Expressing the integrated gain $K_i$ as a function in this manner can adjust the numerical value of the integrated gain $K_i$ (e.g., $K_i$=0) without performing a condition determination process in a program process of the model predictive control using the above continuous transformation method. This can easily generate a program for the model predictive control in accordance with Equations 4 and 5 above.

Alternatively, the predetermined first range may also be defined by an upwardly convex function f(x). In this case, the integrated gain $K_i$ may be set in the following manner:

$$K_i = \alpha(|f(x)| + f(x)).$$

The above technical idea is applicable to even a case where the output of the target model controller 56 is in a three-dimensional or other multidimensional form.

When the output of the target model controller 56 is in a two dimensional form, assuming that the predetermined first range is defined by a circle with a predetermined radius (r) and a center at a target position on the axes x1 and x2 in the working coordinate system, the integrated gain $K_i$ can be set in accordance with Equation 8 given below as an example.

$$K_i = \frac{1}{2r^2}\left(\left|(x_{f1} - x_1)^2 + (x_{f2} - x_2)^2 - r^2\right| - \left((x_{f1} - x_1)^2 + (x_{f2} - x_2)^2 - r^2\right)\right) \quad \text{[Equation 8]}$$

In accordance with Equation 8, when the output of the target model controller 56 is within a circle centered at a target position (xf1, xf2) and a predetermined radius r, that is, when the deviation e is within the predetermined first range, the integrated gain $K_i$ is set. When the output of the target model controller 56 is outside the circle, that is, when the deviation e is outside the predetermined first range, the integrated gain $K_i$ is set to zero. As a result, the integration process in the model predictive control is performed in a limited region, which can appropriately suppress an occurrence of overshoot which may be caused by unnecessary accumulation of an integral amount.

In this configuration example, an acquisition unit 54 is formed within the control structure of the standard PLC 5. When the robot arm 6 is being controlled so as to follow the command xf, if an obstacle is present around the robot arm 6, the robot arm 6 needs to avoid a collision with the obstacle. In this case, the obstacle may or may not move. For this purpose, the acquisition unit 54 acquires information necessary to avoid the collision between the robot arm 6 and the obstacle. More specifically, the acquisition unit 54 acquires predetermined parameters regarding the obstacle recognized from an image captured by a camera 8. The predetermined parameters include the position of the obstacle and the direction in which the obstacle moves toward the robot arm 6. For example, if a region in an image captured by the camera 8 is known in advance, the acquisition unit 54 can acquire a position of the obstacle with a conventional technique, such as that for subjecting the captured image to an image process. Moreover, to determine the moving direction of the obstacle toward the robot arm 6, the acquisition unit 54 calculates the moving direction from acquired past and current positions of the obstacle and acquires a moving direction from a correlation between the moving directions of the obstacle and the robot arm 6.

To avoid the collision between the robot arm 6 and the obstacle, the model predictive controller 53 calculates a probabilistic potential field representative of a probability that an obstacle is present around the robot arm 6, based on the information acquired by the acquisition unit 54 and then reflects this probabilistic potential field in the model predictive control. The method of calculating the probabilistic potential field is a known technique: for example, the model predictive controller 53 can calculate the probabilistic potential field with the technique described in JP-A-2003-241836. More specifically, the model predictive controller 53 reflects the above probabilistic potential field in the stage cost in the model predictive control (the second term on the right side of Equation 2 above corresponds to the stage cost) in accordance with Equation 9 below.

$$L = \frac{1}{2}\left((xref - x)^T(k)Q(xref - x)(k) + (uref - u)^T(k)R(uref - u)(k) + Jp\right) \quad \text{[Equation 9]}$$

$$Jp = \frac{0.2}{\exp(OD)}$$

$$OD = \sqrt{(x_{d1} = x_1)^2 + (x_{d2} - x_2)^2}$$

where OD denotes a distance between a position ($x_{d1}$, $x_{d2}$) of the obstacle and a position ($x_1$, $x_2$) of the end 3c of the robot arm 6, Jp denotes the probabilistic potential field of the obstacle, and L denotes the stage cost. In the above stage cost L, the third term on the right side corresponds to the obstacle stage cost.

In the above way, the model predictive controller 53 reflects the probabilistic potential field attributed to the obstacle in a predetermined evaluation function in the model predictive control, thereby enabling both an improvement in the follow-up capacity of the robot arm 6 and avoidance of the obstacle.

Another aspect of how to generate an obstacle stage cost for avoiding obstacles will be described. In this aspect, the model prediction controller 53 also uses the above probabilistic potential field to generate an obstacle stage cost and then avoids an obstacle. However, a process of generating the obstacle stage cost is performed only when a predetermined condition is satisfied.

The predetermined condition is that the robot arm 6 and the obstacle are in a proximity state in which one of the robot arm 6 and the obstacle is contained in a proximity region centered on the other. Therefore, only when the robot arm 6 and the obstacle are in the proximity state, the model prediction controller 53 generates the obstacle stage cost Otherwise, or if both of them are sufficiently apart from each other, the model prediction controller 53 does not generate the obstacle stage cost for avoiding the obstacle. As an example, when the output of, the target model controller 56 is in a two-dimensional form, the model prediction controller 53 sets a probabilistic potential field represented by the function |g(x)|−g(x) to one of the robot arm 6 and the obstacle under the condition of a downwardly convex function being defined as g(x). Then, the model prediction controller 53 sets an evaluation position for calculating the probabilistic potential field on the other of the robot arm 6 and the obstacle, or set it at a position near the robot arm 6 and the obstacle. In this way, the model prediction controller 53 generates the probabilistic potential field only when the evaluation position is within a region defined by |g(x)|−g(x), that is, when the robot arm 6 and the obstacle are in the proximity state, thus generating the obstacle stage cost. When the evaluation position is outside the above region, the probabilistic potential field becomes zero, and thus the obstacle stage cost is not generated, consequently, it is possible to generate the obstacle stage cost without performing the condition determination process in a program process of the model predictive control by the continuous transformation method described above. Thus, it is possible to easily generate a program for the model predictive control in accordance with Equations 4 and 5 above.

As an alternative method, the model prediction controller 53 may set a probabilistic potential field represented by the function |g(x)|+g(x) on one of the robot arm 6 and the obstacle under the condition of an upwardly convex function being defined as g(x). Then, the model prediction controller 53 may set an evaluation position for calculating the probabilistic potential field on the other of the robot arm 6 and the obstacle or may set it at a position near the robot arm 6 and the obstacle.

When the output of the target model controller 56 is in a two-dimensional form, the model prediction controller 53 can set the probabilistic potential field for calculating the obstacle stage cost in accordance with Equation 10 below, as an example.

$$J_p = \frac{\alpha}{2r^2} \left( \left| \frac{(xc_1 - x_1)^2}{r_{p1}^2} + \frac{(xc_2 - x_2)^2}{r_{p2}^2} - r^2 \right| - \left( \frac{(xc_1 - x_1)^2}{r_{p1}^2} + \frac{(xc_2 - x_2)^2}{r_{p2}^2} - r^2 \right) \right)$$ [Equation 10]

$J_p$: potential field $xc_1, xc_2$: central position of potential field $x_1, x_2$: evaluation position of potential field $r_{p1}, r_{p2}$: half of length of potential field along each axis $r$: scaling coefficient $\alpha$: any constant giving maximum value of potential field In accordance with Equation 10, a probabilistic potential field having a length along the axis x1 denoted as $r_{p1}$ and a length along the axis x2 defined as $r_{p2}$ is set with its center positioned at ($xc_1$, $xc_2$) on the robot arm 6 or the obstacle. In addition, an evaluation position of this potential field is set to ($x_1$, $x_2$) and is placed near an obstacle or a robot arm 6 to which the potential field is not set, or both. Making the setting in this manner can generate the obstacle stage cost in the model predictive control only when the robot arm 6 and the obstacle are in the proximity state. This suppresses a repulsive force for avoiding the obstacle in terms of control from improperly acting on the robot arm 6, thereby controlling lowering of the follow-up capacity of the robot arm 6.

When the number of dimensions of the output of the target model controller 56 is generalized, the model prediction controller 53 can set the probabilistic potential field for calculating the obstacle stage cost in accordance with Equation 11 below as an example, $$J_p = \frac{\alpha}{2r^2} \left( \left| \sum_{i=1}^{n} \frac{(xc_1 - x_1)^2}{r_{p1}^2} - r^2 \right| - \left( \sum_{i=1}^{n} \frac{(xc_i - x_i)^2}{r_{pi}^2} - r^2 \right) \right)$$ [Equation 11]

Figure 5:
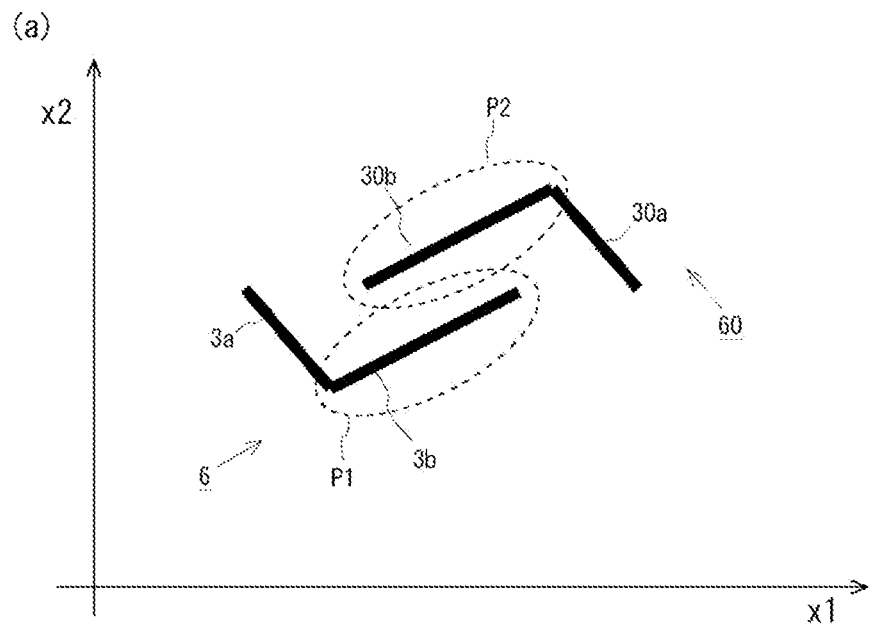
FIGS. 5(a) and 5(b) are first diagrams each illustrating the movement of the robot arm driven in accordance with a command from the standard PLC.
Figure 5:
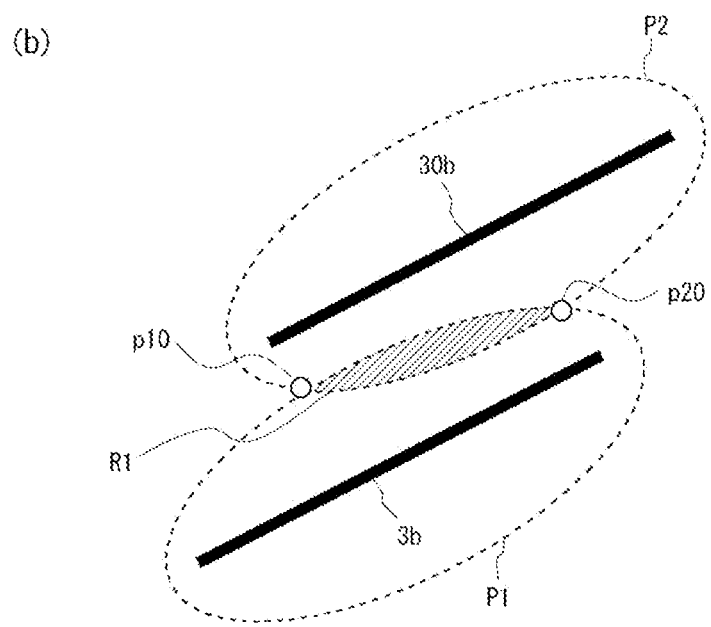

$J_p$: potential field $xc_i$: central position of potential field $x_i$: evaluation position of potential field $r_{pi}$: half of length of potential field along each axis $n$: the number of dimensions $r$: scaling coefficient $\alpha$: any constant Second Configuration Example A description will be given of a form in which the standard PLC 5 supplies a target command in order to avoid an obstacle according to this configuration example. In this configuration example, as illustrated in FIG. 5, an elliptical potential field expressed in Equation 10 is set for each of the robot arm 6 and an obstacle. FIG. 5 (a) illustrates a state of potential fields set for the robot arm 6 to be controlled and another robot arm 60 that can be an obstacle to the robot arm 6; FIG. 5 (b) illustrates the potential fields in an enlarged manner. The another robot arm 60, which has substantially the same configuration as the robot arm 6, has a first arm 30a and a second arm 30b rotationally driven in a plane by two joints, based on a working coordinate system defined by axes X1 and X2.

In this configuration example, a first potential field P1 having an elliptical shape is set for the robot arm 6 to be controlled, in accordance with the shape of the second arm 3b. More specifically, the first potential field P1 having an elliptical shape is set with its major axis extending along the second arm 3b. This setting considers the fact that it is necessary to protect the output unit of the robot arm 6 which is disposed at the end 3c of the second arm 3b from colliding with the obstacle. This means that the second arm 3b corresponds to a predetermined part of the robot arm 6. Likewise, a second potential field P2 is set for the another robot arm 60 having an elliptical shape which can be an obstacle to the robot arm 6, with its major axis extending along the second arm 30b. This setting also considers the fact that it is necessary to protect the second arm 30b from colliding with the robot arm 6, similar to the setting of the first potential field P1. For an elliptical potential field, refer to Equation 10 above. In this case, the potential fields set for the robot arm 6 and the another robot arm 60 do not have to have the same shape and size as each other. Both of the potential fields are preferably formed suitably for the shapes and sizes of corresponding arms.

In the above case, under the model predictive control of the robot arm 6, an evaluation position for generating an obstacle stage cost is determined to be at least one point in the working coordinate system which is contained in an overlapping region R1 (a diagonal line region illustrated in FIG. 5 (b)) of the first potential field P1 and the second potential field P2. An example of how to set the evaluation position will be described as follows. It should be noted that the following is an example, and therefore the evaluation position may be set at any other point.

(1) A point positioned near intersections p10 and p20 of the outer lines of the first potential field P1 and the second potential field P2 and within the overlapping region (2) A point positioned at the middle point of the intersections p10 and p20 of the outer lines of the first potential field P1 and the second potential field P2

(3) A point positioned on a virtual line by which the middle point described in (2) is connected to the central point of the second arm 3b and within the overlapping region.

Since both of the first potential field P1 and the second potential field P2 have an elliptical shape in this configuration example, it is possible to easily determine whether the first potential field P1 geometrically overlaps the second potential field P2. Furthermore, it is possible to make the overlapping determination more easily by translating, rotating, and scaling both the potential fields (also refer to a technique disclosed in a fifth configuration example described later) in such a way that the center of one of the potential fields is positioned at the calculational origin, during the calculation (including that of the intersections p10 and p20). However, this description is not intended to limit the shape of both the potential fields to an elliptical one. Alternatively, both the potential fields may employ any given shape, or the shape of both the potential fields may be set to a three-dimensional shape in consideration of the movement of the controlled object and the obstacle.

Setting the evaluation position in the above manner can generate an obstacle stage cost in the model predictive control related to the robot arm 6 when the first potential field P1 partially overlaps the second potential field P2. In short, the overlapping of both potential fields means that both the robot arm 6 and the another robot arm 60 are in a proximity state. In this state, the obstacle stage cost is generated with the probabilistic potential fields set to the first potential field P1 and the second potential field P2 in the model predictive control in order to avoid the collision between the robot arms 6 and 60. When the first potential field P1 do not overlap the second potential field P2, the evaluation position is not set, in which case the obstacle stage cost is not generated in the model predictive control. This configuration can suppress the generation of an improper repulsive force for avoiding the collision. In addition, it is possible to set potential fields suitably for the shapes of the robot arm 6 and the another robot arm 60 in order to set a potential field corresponding to each of the robot arm 6 and the another robot arm 60. This can prevent the robot arm 6 from being unnecessarily greatly displaced in order to avoid the collision.

Figure 6:
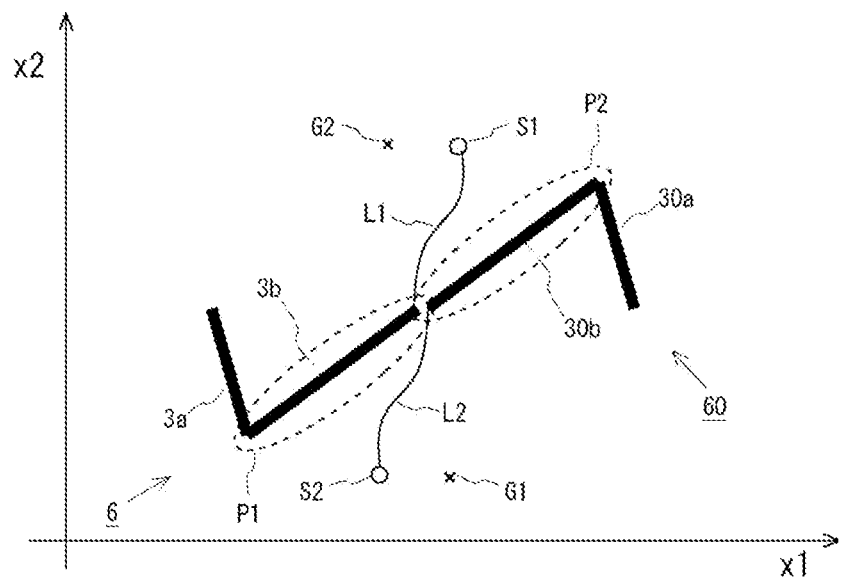
FIGS. 6(a) and 6(b) are second diagrams each illustrating the movement of the robot arm driven in accordance with the command from the standard PLC.
Figure 6:
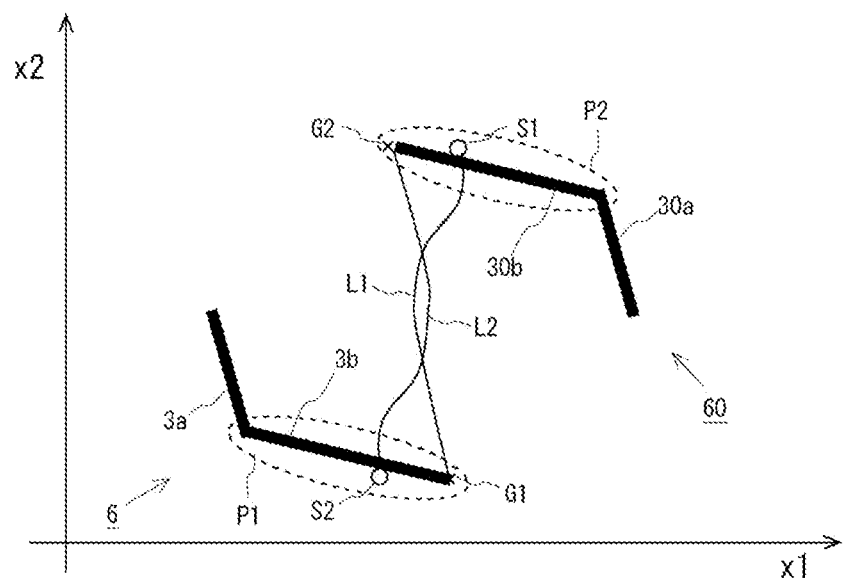

With reference to FIG. 6, a description will be given of the movements of the robot arm 6 and the another robot arm 60 when the robot arm 6 is supplied with a target command for avoiding the obstacle from the standard PLC 5 according to this configuration example. In FIGS. 6 (a) and 6 (b), the command generator 50 generates the predetermined command xf so that the end 3c of the robot arm 6 moves from a start point S1 to a target point G1. In this case, the command generator 50 also generates a predetermined command for the another robot arm 60, which can be an obstacle to the robot arm, so that its end moves from a start point S2 to a target point G2.

FIG. 6 (a) illustrates the state where each robot arm starts being driven to move to a roughly middle point between the start point and the target point; FIG. 6 (b) illustrates the state where each robot arm reaches the target point. A locus of the end 3c of the robot arm 6 is indicated by a line L1, whereas a locus of the end of the another robot arm 60 is indicated by a line L2. As described above, the model predictive control related to the robot arm 6 is performed based on the working coordinate system. Thus, immediately after departing from the start point S1, the end 3c of the robot arm 6 moves along a substantially straight line optimized toward the target point G1. Then, when the robot arm 6 and the another robot arm 60 are in the proximity state, drive control is performed to avoid the collision therebetween, and the locus of the end 3c is thereby curved. After the collision has been avoided, that is, when the robot arm 6 and the another robot arm 60 are released from the proximity state, the robot arm 6 moves along a substantially straight line optimized from its current position toward the target point G1. This drive control also applies to the movement of the another robot arm 60. In this way, this configuration example achieves a high follow-up capacity of the robot arm 6 and appropriate collision avoidance.

Third Configuration Example

A description will be given of a form in which the standard PLC 5 supplies a target command in order to avoid an obstacle according to this configuration example. As disclosed above and illustrated in FIG. 5, the standard PLC 5 causes the calculator 57 to convert the output y of the target model controller 56 into a target command in the rotating coordinate system corresponding to each control axis of the robot arm 6 and then causes the supply unit 58 to supply the target command to the servo driver 4. In this case, the calculator 57 calculates the target command in accordance with Equation 6 above and based on the geometrical relationship of the machine structure of the robot arm 6. As a result of this calculation, the calculator 57 may provide predetermined complex number solutions containing imaginary numbers, as the target commands θ1 and θ2. This means that the machine structure of the robot arm 6 becomes rate-determining and that the output of the target model controller 56, which is obtained by inputting the output of the model predictive controller 53, cannot be physically realized. In such cases, the real part of the complex number solution is tentatively calculated as the target command, as expressed in Equation 12 below. This can prevent the servo control of the robot arm 6 from being interrupted.

[Equation 12]

$$\theta_2 = \mathrm{atan2}\left(\frac{\pm \mathrm{real}\left(\sqrt{(2L_1L_2)^2 - \{L_0^2 - (L_1^2 + L_2^2)\}^2}\right)}{2L_1L_2}, \frac{L_0^2 - (L_1^2 + L_2^2)}{2L_1L_2}\right)$$

In Equation 12, the function real is a function that returns the real part of the complex number solution XY when expressed in real (XV).

Figure 7:
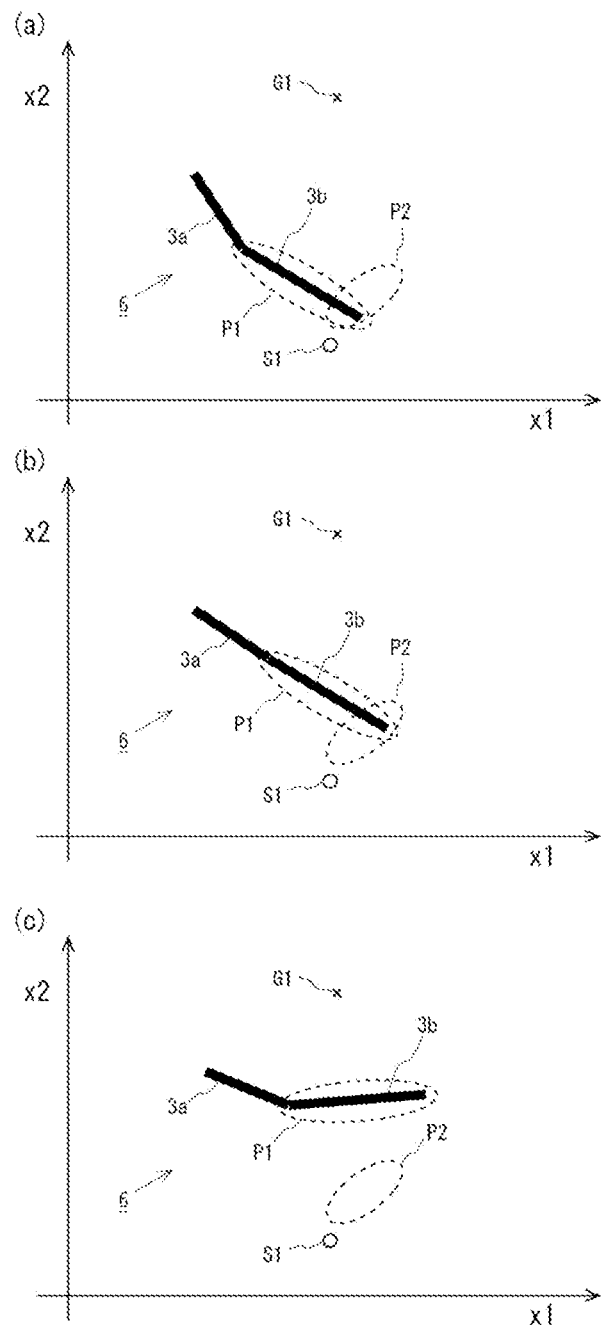
FIGS. 7(a), 7(b), and 7(c) are third diagrams each illustrating the movement of the robot arm driven in accordance with the command from the standard PLC.

With reference to FIG. 7, a description will be given of the movement of the robot arm 6 when the robot arm 6 is supplied with a target command for avoiding the obstacle from the standard PLC 5 according to this configuration example. In this configuration example, the standard PLC 5 supplies the target command so that the end 3c of the robot arm 6 moves from the start point S1 to the target point G1. FIGS. 7 (a) to 7 (c) do not illustrate an obstacle but illustrates only a related second potential field P2. In FIG. 7 (a), the calculator 57 calculates the target command in accordance with Equation 6. However, after time has passed, the robot arm 6 enters the state illustrated in FIG. 7 (b). In this case, the target command calculated in accordance with Equation 6 is a complex number solution including an imaginary number. Therefore, the calculator 57 calculates the real part of the complex number solution as the target command again, in accordance with Equation 12. In this case, a rotation angle θ2 between the first arm 3a and the second arm 3b becomes zero, so that the robot arm 6 enters a state of being substantially straightened, as illustrated in FIG. 7 (b). Then, after time has passed, the calculator calculates the target command in accordance with Equation 6. This target command is a solution that does not contain an imaginary number. As a result, the robot arm 6 is in the state illustrated in FIG. 7 (c). In this way, the output of the target model controller 56, which is obtained, by inputting the output of the model predictive controller 53, returns to a state in which the robot arm 6 can physically realize the output. Consequently, the servo control of the robot arm 6 is continued without being interrupted and finally restores the capacity to follow the predetermined command xf.

Fourth Configuration Example

A description will be given of a form in which the standard PLC 5 supplies a target command in order to avoid an obstacle according to this configuration example. In this configuration example, a detector 55 illustrated in FIG. 4 will be described. The detector 55 detects that the robot arm 6 is in a deadlock state. The deadlock state refers to a state in which the robot arm 6 is servo-controlled in accordance with a predetermined command xf but is not displaced smoothly. In this configuration example, the robot arm 6 may be in the deadlock state because of the another robot arm 60, which can be an obstacle.

A description will be given below, as two examples of a form in which the detector 55 detects the deadlock state.

(First Detection Form)

Under the model predictive control, as described above, the model predictive controller 53 is configured to repeatedly execute a predetermined operation, in accordance with the predetermined evaluation function expressed in Equation 2, within a preset predictive zone having a predetermined time width in order to obtain a control input u, which is the output of the model predictive controller 53. The predetermined operation is, for example, an operation of searching for a control input u that causes the partial derivative of Hamiltonian H expressed in Equation 5 to approach zero. In this case, if the robot arm 6 is in the deadlock state, the model predictive controller 53 repeats the predetermined calculation but cannot derive an appropriately optimized control input that satisfies the evaluation function. In consideration of this fact, the detector 55 can detect that the robot arm 6 is in the deadlock state when the model predictive controller 53 performs the predetermined calculation more than a reference number of times.

(Second Detection Form)

In another form, when the robot arm 6 and the another robot arm 60 are in the above proximity state, that is, when the first potential field P1 at least partially overlaps the second potential field P2, if the calculator 57 obtains, as a target command, a predetermined complex number solution containing an imaginary number from the output y of the target model controller 56, the detector 55 can determine that the robot arm 6 is in the deadlock state. The state where the calculator 57 obtains a complex number solution containing an imaginary number when the proximity state is formed, as described above, refers to that where the geometrical relationship of the machine structure of the robot arm 6 is rate-determining and thus the robot arm 6 fails to sufficiently follow the predetermined command xf. For this reason, it is possible to detect the deadlock state described above.

This configuration example is not intended to hinder utilization of a detection form other than the above. For example, the detector 55 may detect the deadlock state, based on rotation speeds of the two joint axes constituting the robot arm 6.

When the detector 55 detects the deadlock state, the model predictive controller 53 adjusts potential fields that have been set for the robot arm 6 and the another robot arm 60, which can be an obstacle, thereby releasing the deadlock state. Two examples of the form of releasing this deadlock state will be described below.

(First Release Form)

Figure 8:
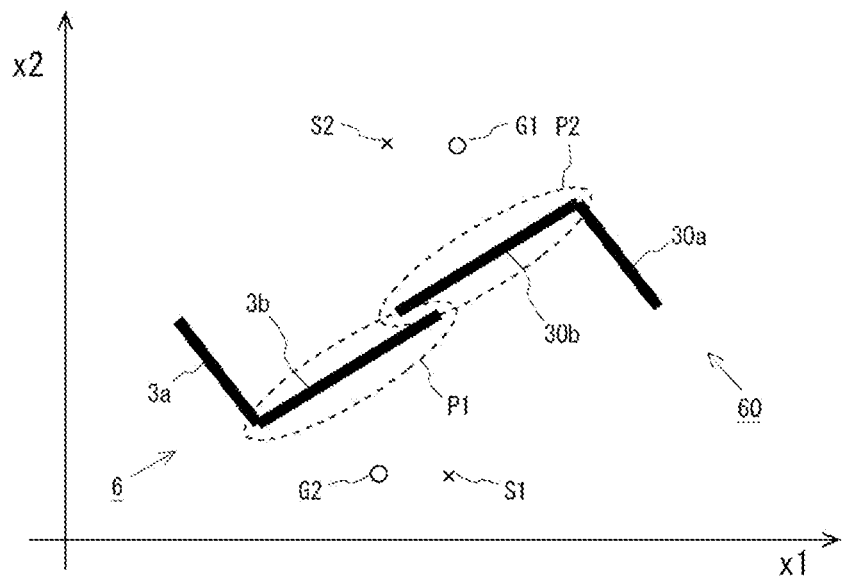
FIGS. 8(a) and 8(b) are fourth diagrams each illustrating the movement of the robot arm driven in accordance with the command from the standard PLC.
Figure 8:
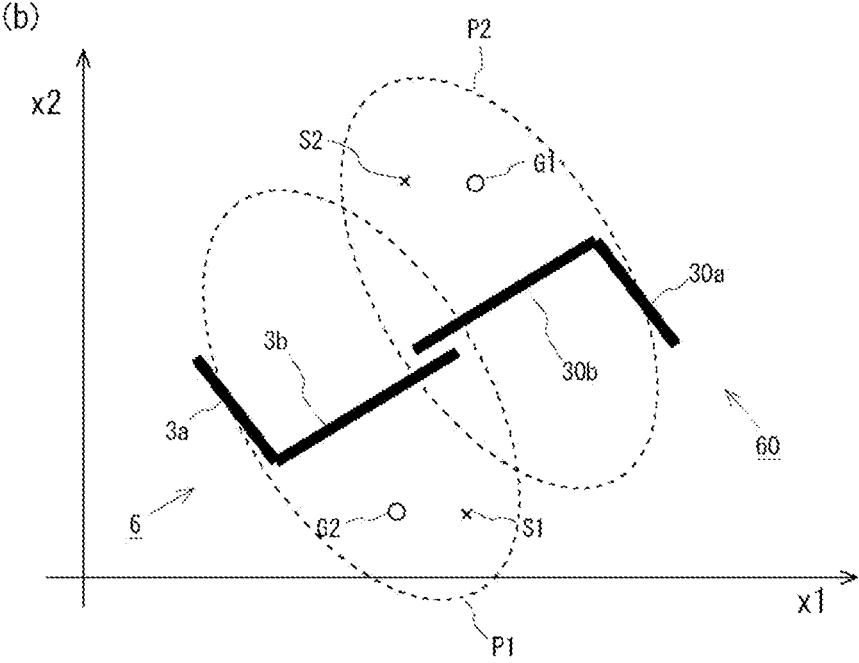

A first release form will be described with reference to FIGS. 8 (*a*) and 8 (*b*). FIG. 8 (*a*) illustrates the robot arm 6 in the deadlock state and the another robot arm 60. In this state, the first potential field P1 having an elliptical shape is set for the robot arm 6 along the second arm 3*b*. Further, the extending direction of the major axis of this elliptical shape substantially coincides with that of the second arm 3*b*. Likewise, the second potential field P2 having an elliptical shape is set for the another robot arm 60 along the second arm 30*b*. Further, the extending direction of the major axis of this elliptical shape substantially coincides with that of the second arm 30*b*.

In the above state, the model predictive controller 53 changes the first potential field P1 that has been set for the second arm 3*b* of the robot arm 6, as illustrated in FIG. 8 (*b*). More specifically, although the first potential field P1 having an elliptical shape has been set along the second arm 3*b*, the model predictive controller 53 changes the shape and size of the first potential field P1 in such a way that the extending direction of the minor axis of the ellipse substantially coincides with that of the second arm 3*b*. After this change, the changed first potential field P1 is still surrounding the second arm 3*b*. Likewise, the model predictive controller 53 changes the shape and size of the second potential field P2 that has been set for the second arm 30*b* of the another robot arm 60. As a result, the direction of the major axis direction of each potential field is rotated by 90 degrees as compared with the state illustrated in FIG. 8 (*a*). This changes the application of the repulsive force for avoiding the collision to the robot arm 6, expectedly releasing the deadlock state. After having released the deadlock state, the model predictive controller 53 may return the shape of each potential field into the previous one or may maintain the shape of the changed potential field.

(Second Release Form)

Figure 9:
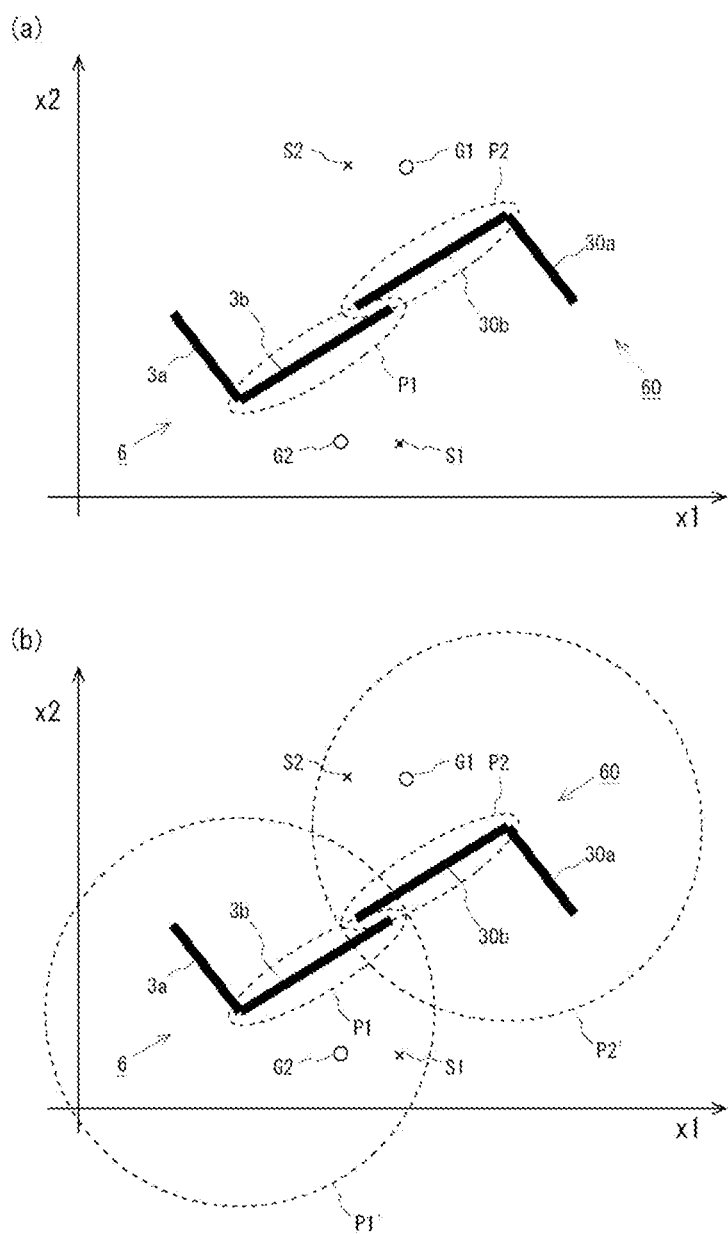
FIGS. 9(a) and 9(b) are fifth diagrams each illustrating the movement of the robot arm driven in accordance with the command from the standard PLC.

A second release form will be described with reference to FIGS. 9 (*a*) and 9 (*b*). FIG. 9 (*a*) illustrates the robot arm 6 in the deadlock state and the another robot arm 60; this state is the same as in FIG. 8 (*a*). In this state, as illustrated in FIG. 9 (*b*), the model predictive controller 53 sets a new potential field P1' for the second arm 3*b* of the robot arm 6 in addition to the first potential field P1. More specifically, the model predictive controller 53 maintains the state of the first potential field P1 and further sets the potential field P1' having a circular shape, expressed by Equation 13 below, centered on the second joint at which the motor 2*a* of the robot arm 6 is disposed.

[Equation 13]

$$J_p = \frac{\alpha}{2r^2}\left(\left|\frac{(xc_1 - x_1)^2}{r_{p1}^2} + \frac{(xc_2 - x_2)^2}{r_{p2}^2} - r^2\right| - \left(\frac{(xc_1 - x_1)^2}{r_{p1}^2} + \frac{(xc_2 - x_2)^2}{r_{p2}^2} - r^2\right)\right) + J_{eib}$$

$$J_{eib} = \frac{\beta}{2r_p^2}\left(\left|(x_{e1} - x_1)^2 + (x_{e2} - x_2)^2 - r_p^2\right| - \left((x_{e1} - x_1)^2 + (x_{e2} - x_2)^2 - r_p^2\right)\right)$$

$J_{eib}$: potential field added to second joint $x_{e1}$, $x_{e2}$: central position of added potential field(position of second joint)

$x_i$, $x_2$: evaluation position of potential field $r_p$: radius of added potential field $\beta$: any constant giving maximum value of added potential field The circular potential field P1' also surrounds the entire robot arm 6 including the second arm 3b. Likewise the model predictive controller 53 further sets a new circular potential field P2' for the second arm 30b of another robot arm 60 centered on the second joint, in addition to the second potential field P2.

As a result of the above, the application of the repulsive force for avoiding the collision to the robot arm 6 changes, thereby expectedly releasing the deadlock state. After having released the deadlock state, the model predictive controller 53 may clear the additional potential fields or may maintain the additional potential fields.

Fifth Configuration Example

In the foregoing second configuration example, potential fields (first potential field P1 and second potential field P2) set for the robot arm 6 and an obstacle (e.g., another robot arm 6) and are used as probabilistic potential fields of the present application. In this configuration example, instead of the above aspect, a single probabilistic potential field is generated based on provisional potential fields related to the robot arm 6 and the obstacle. Then, the model predictive control is performed by reflecting the obstacle stage cost related to this probabilistic potential field. Hereinafter, a detailed description will be given of how to generate a probabilistic potential field Jp in this configuration example.

As an example, a description will be given using an example of the pair of robot arms 6 and 60 illustrated in FIGS. 5 (a) and 5 (b). A provisional first potential field Jp1 related to the robot arm 6 to be controlled is a region having an elliptical shape formed so as to surround the second arm 3b in accordance with the shape of the second arm 3b and can be defined by Equation 14 below.

$$J_{p1} = \frac{\alpha 1}{2r^2}\left(\left|\sum_{i=1}^{n}\frac{(xc_1-x_1)^2}{r_{pi}^2}-r^2\right|-\left(\sum_{i=1}^{n}\frac{(xc_i-x_i)^2}{r_{pi}^2}-r^2\right)\right)$$ [Equation 14]

$J_{p1}$: elliptical potential field $xc_i$: central position of elliptical potential field $x_i$: evaluation position of potential field $r_{pi}$: half of length of elliptical potential field along each axis $n$: the number of dimensions $r$: scaling coefficient $\alpha 1$: any constant A provisional second potential field Jp2 related to another robot arm 60, which can be an obstacle to the robot arm 6, is defined as a region having a circular shape formed so as to surround the second arm 30b and is defined by Equation 15 below.

$$J_{p2} = \frac{\alpha 2}{2r^2}\left(\left|\sum_{i=1}^{n}\frac{(xsc_1-x_1)^2}{r_{sp}^2}-r^2\right|-\left(\sum_{i=1}^{n}\frac{(xsc_i-x_i)^2}{r_{sp}^2}-r^2\right)\right)$$ [Equation 15]

$J_{p2}$: circular potential field $xsc_i$: central position of circular potential field $x_i$: evaluation position of potential $r_{sp}$: half of length of each axis in elliptical potential field along each axis $n$: the number of dimensions $r$: scaling coefficient $\alpha 2$: any constant Then, the probabilistic potential field Jp in this configuration example is a region defined by the locus of the central point of the second potential field Jp2 when the second potential field Jp2 is slid on the outer circumference of the first potential field Jp1 having an elliptical shape. The probabilistic potential field Jp can be defined by Equation 16 below. In the present application, the central point of the second potential field Jp2 is defined as the geometric center of gravity of the shape of the second potential field Jp2.

$$J_{p} = \frac{\alpha 1}{2r^2}\left(\left|\sum_{i=1}^{n}\frac{(xc_1-xsc_1)^2}{(r_{pi}+r_{sp})^2}-r^2\right|-\left(\sum_{i=1}^{n}\frac{(xc_i-xsc_i)^2}{(r_{pi}+r_{sp})^2}-r^2\right)\right)$$ [Equation 16]

$J_p$: potential field $xsc_i$: central position of circular potential field(evaluation position of potential)

$n$: the number of dimensions $r$: scaling coefficient $\alpha 3$: any constant

Figure 10:
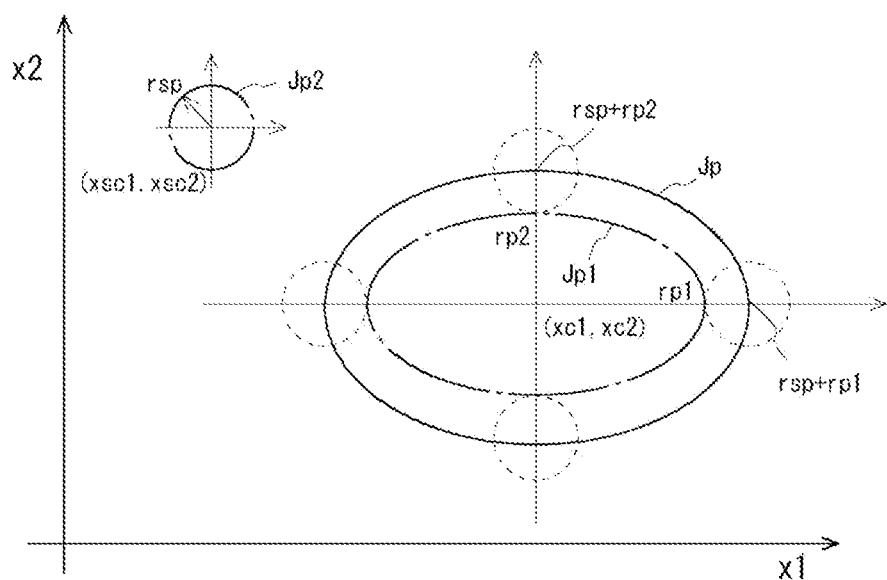
FIG. 10 is an explanatory diagram of how to set a probabilistic potential field.

FIG. 10 illustrates an image of the probabilistic potential field Jp defined based on Equation 16. In FIG. 10, Jp1 and Jp2 each of which is indicated by the alternate long and short dash lines denote, respectively, provisional potential fields defined based on Equations 14 and 15 above. It should be noted that the provisional potential fields Jp1 and Jp2 are not actually set under the model predictive control and are simply illustrated in FIG. 10 for the purpose of explaining how to generate the probabilistic potential field Jp to be actually set. The model predictive controller 53 uses the model predictive control to avoid the collision between a controlled object and an obstacle based on their correlation. For this purpose, in this configuration example, the model predictive controller 53 does not individually set probabilistic potential fields for the controlled object and the obstacle to calculate obstacle stage cost but sets the probabilistic potential field Jp only for the controlled target, thereby performing substantially equivalent model predictive control. In this form, under the model predictive control, the model predictive controller 53 may generate an obstacle stage cost when the central point of the obstacle is contained in the probabilistic potential field Jp that has been set for the controlled object (refer to Equation 16), instead of when it is determined that the probabilistic potential field for the control target overlaps that for the obstacle (e.g., refer to the foregoing second configuration). Consequently, it is possible to effectively lighten a calculation load related to model predictive control.

When the provisional second potential field Jp2 has a circular shape as described above, the distance between its central point and the outer circumference is always constant (rsp). However, when the provisional second potential field Jp2 has a non-circular shape, the distance between its central point and the outer circumference may vary. Even in this case, it is possible to set the probabilistic potential field Jp, based on the above technical idea. More specifically, the probabilistic potential field Jp may be a region defined by the locus of the central point of the second potential field Jp2 when the second potential field Jp2 is slid on the outer circumference of the first potential field Jp1 having an elliptical shape while the attitude of the second potential field Jp2 is adjusted relative to the first potential field Jp1 so that the distance between the central point of the second potential field Jp2 and the outer circumference of the first potential field Jp1 becomes maximum. As another method, the probabilistic potential field Jp may be a region defined by the locus of the central point of the second potential field Jp2 when the second potential field Jp2 is slid on the outer circumference of the first potential field Jp1 having an elliptical shape while the attitude of the second potential field Jp2 is adjusted relative to the first potential field Jp1 so that the distance between the central point of the second potential field Jp2 and the outer circumference of the first potential field Jp1 becomes minimum. As still another method, the probabilistic potential field Jp may be a region defined by the locus of the central point of the second potential field Jp2 when the second potential field Jp2 is slid on the outer circumference of the first potential field Jp1 having an elliptical shape while the attitude of the second potential field Jp2 is maintained relative to the first potential field Jp1 so that the distance between the central point of the second potential field Jp2 and the outer circumference of the first potential field Jp1 becomes a value between the maximum and the minimum. In any of the above forms, it is possible to effectively lighten a calculation load related to the model predictive control by generating the obstacle stage cost when the central point of the obstacle is contained in the probabilistic potential field Jp that has been set for the control target under the model predictive control.

In the example illustrated in FIG. 10, two-dimensional potential fields (circular shape and elliptical shape) are illustrated; however, the dimensions of each potential, for example, can be appropriately set, for example, in accordance with the movements of the controlled object and the obstacle. For example, when the robot arms 6 to be controlled and the robot arm 60 are configured to move in a three-dimensional space, the potential field having an ellipsoidal shape illustrated in FIG. 10 may be a potential field having an ellipsoidal stereoscopic shape, whereas the potential field having a circular shape may be a potential field having a circular stereoscopic shape. Alternatively, each potential field may have a shape other than a circular shape, an ellipsoidal shape, an ellipsoidal stereoscopic shape, or a circular stereoscopic shape.

Other Configuration Examples

The stage cost L (refer to Equation 9) employed in the above configuration examples may contain a saturation-related cost Lu related to at least one threshold of the upper and lower limits, of the control input, in addition to the above state quantity cost, control input cost, and obstacle stage cost. As an example, the stage cost L containing the saturation-related cost Lu can be defined as the function expressed in Equation 17 below.

$$L = L + Lu \qquad \text{[Equation 17]}$$

$$Lu = (u(k)^2 - umax^2) + |(u(k)^2 - umax^2)|$$

In Equation 17 above, the saturation-related cost Lu is defined as a function: when the control input exceeds its threshold, or an upper limit value umax, the saturation-related cost Lu increases as the difference between the control input and upper limit value umax increases, and when the input is less than or equal to the upper limit umax, the value of saturation-related cost Lu is set to zero. Reflecting the saturation-related cost Lu in the stage cost in the predictive control can suppress the control input from being calculated to an unnecessarily large value. As a result, it is possible to appropriately reduce the avoidance locus of the robot arm 6, for example, when the robot arm 6 avoids an obstacle, thereby contributing to suppression of vibrations of the robot arm 6 upon the avoidance.

<Supplementary Note 1>

A control device (5) is configured to cause an output of a target device (6) to be servo-controlled to follow a predetermined command in a predetermined working coordinate system, the target device (6) having one or more control axes, an independent generalized coordinate system being set for each of the one or more control axes, the independent generalized coordinate being used to servo-control each of the one or more control axes. The control device (5) includes: a target model controller (56), a state acquisition unit (52), a model predictive controller, a calculator (57), and a supply unit (58). The target model controller (56) possesses a target model in which the target device (6) is modeled based on the predetermined working coordinate system and is configured to simulate an output according to the predetermined working coordinate system by using the target model and to output a simulation result. The state acquisition unit (52) is configured to acquire a value of a predetermined state variable based on the predetermined working coordinate system, the predetermined state variable being related to the target model possessed by the target model controller (56). The model predictive controller possesses a predictive model in which a correlation between the predetermined state variable and a control input (u) to the target model controller (56) is defined in a form of a predetermined state equation based on the predetermined working coordinate system and is configured to receive the predetermined command, to perform the model predictive control within a predictive zone having a predetermined time width in accordance with a predetermined evaluation function and based on the predictive model, and to output a value of the control input (u) at least at an initial time of the predictive zone, as the control input (u) to the target model controller (56), the control input (u) being related to the predetermined command. The calculator (57) is configured to calculate a target command for each control axis from the output of the target model controller (56) which is based on the predetermined working coordinate system, the output of the target model controller (56) being obtained by inputting an output of the model predictive controller to the target model, the target command according to a geometric relationship of a machine structure related to the one or more control axes in the target device (6) and being based on the generalized coordinate system set for each of the one or more control axes. The supply unit (58) is configured to supply the target command to each of the one or more control axes to the target device.

DESCRIPTION OF SYMBOLS 1 network
2a,2b motor
3a first arm
3b second arm
3c end
5 standard PLC
6 robot arm
50 command generator
51 integrator
52 state acquisition unit
53 model predictive controller
54 acquisition unit
55 detector
56 target model controller
57 calculator
58 supply unit
60 another robot arm (obstacle)

The invention claimed is:

1. A programmable logic controller (PLC) that causes an output of a target device to be servo-controlled to follow a predetermined command in a predetermined working coordinate system, the target device having one or more control axes, a generalized coordinate system being set independently for each of the one or more control axes, the generalized coordinate system being used to servo-control each of the one or more control axes, the PLC comprising:
a processing unit configured to function as:
a target model controller possessing a target model in which the target device is modeled based on the predetermined working coordinate system, the target model controller configured to simulate an output according to the predetermined working coordinate system by using the target model and to output a simulation result;
a state acquisition unit configured to acquire a value of a predetermined state variable based on the predetermined working coordinate system, the predetermined state variable being related to the target model controller possessed by the target model controller;
a model predictive controller possessing a predictive model in which a correlation between the predetermined state variable and a control input to the target model controller is defined in a form of a predetermined state equation based on the predetermined working coordinate system, the model predictive controller configured to receive the predetermined command, to perform a model predictive control within a predictive zone having a predetermined time width in accordance with a predetermined evaluation function and based on the predictive model, and to output a value of the control input at least at an initial time of the predictive zone, as the control input to the target model controller, the control input being related to the predetermined command;
a calculator configured to calculate a target command for each control axis from the output of the target model controller which is based on the predetermined working coordinate system, the output of the target model controller being obtained by inputting an output of the model predictive controller to the target model, the target command according to a geometric relationship of a machine structure related to the one or more control axes in the target device and being based on the generalized coordinate system set for each of the one or more control axes; and
a supply unit configured to supply the target command to a servo driver to servo-control each of the one or more control axes of the target device,
wherein when obtaining, as the target command, a predetermined complex number solution containing an imaginary number from the output of the target model controller in accordance with the geometric relationship of the machine structure, the calculator calculates a real part of the predetermined complex number solution as the target command.

2. The PLC according to claim 1, wherein each of the predictive model and the target model is set as a one-inertia model related to a coordinate axis in the predetermined working coordinate system.

3. The PLC according to claim 1, wherein
each of the one or more control axes includes a rotatably-driven or linearly-driven actuator, and
the generalized coordinate system is a rotating coordinate system related to a rotational angle of each of the one or more control axes or a linear coordinate system related to a linearly moving amount of each of the one or more control axes.

4. The PLC according to claim 1, wherein the processing unit is further configured to function as an integrator configured to receive a deviation between the predetermined command and the output of the target model controller, wherein
the model predictive controller performs the model predictive control by receiving an output of the integrator that has received the deviation, and
the predictive model contains a predetermined integration term expressed by a product of the deviation between the output of the target model controller and the predetermined command and a predetermined integrated gain.

5. The PLC according to claim 4, wherein
when a value of the deviation is contained in a predetermined first range including zero, the predetermined integrated gain is adjusted to increase as the deviation decreases, and when the value of the deviation is not contained in the predetermined first range, the predetermined integrated gain is set to zero.

6. The PLC according to claim 4, wherein
the output of the target model controller is a multidimensional output,
the predetermined first range is defined as a downwardly convex function f(x), and
the predetermined integrated gain is expressed as a function of |f(x)|−f(x).

7. The PLC according to claim 4, wherein
the output of the target model controller is a multidimensional output,
the predetermined first range is defined as an upwardly convex function f(x), and
the predetermined integrated gain is expressed as a function of |f(x)|+f(x).

8. A programmable logic controller (PLC) that causes an output of a target device to be servo-controlled to follow a predetermined command in a predetermined working coordinate system, the target device having one or more control axes, a generalized coordinate system being set independently for each of the one or more control axes, the generalized coordinate system being used to servo-control each of the one or more control axes, the PLC comprising:
- a processing unit configured to function as:
  - a target model controller possessing a target model in which the target device is modeled based on the predetermined working coordinate system, the target model controller configured to simulate an output according to the predetermined working coordinate system by using the target model and to output a simulation result;
  - a state acquisition unit configured to acquire a value of a predetermined state variable based on the predetermined working coordinate system, the predetermined state variable being related to the target model possessed by the target model controller;
  - a model predictive controller possessing a predictive model in which a correlation between the predetermined state variable and a control input to the target model controller is defined in a form of a predetermined state equation based on the predetermined working coordinate system, the model predictive controller configured to receive the predetermined command, to perform a model predictive control within a predictive zone having a predetermined time width in accordance with a predetermined evaluation function and based on the predictive model, and to output a value of the control input at least at an initial time of the predictive zone, as the control input to the target model controller, the control input being related to the predetermined command;
  - a calculator configured to calculate a target command for each control axis from the output of the target model controller which is based on the predetermined working coordinate system, the output of the target model controller being obtained by inputting an output of the model predictive controller to the target model, the target command according to a geometric relationship of a machine structure related to the one or more control axes in the target device and being based on the generalized coordinate system set for each of the one or more control axes; and
  - a supply unit configured to supply the target command to a servo driver to servo-control each of the one or more control axes of the target device,
- wherein the processing unit is further configured to function as an acquisition unit configured to acquire a position of an obstacle relative to the target device, wherein
- a stage cost calculated from the predetermined evaluation function contains a state quantity cost that is a stage cost related to the predetermined state variable, a control input cost that is a stage cost related to the control input, and an obstacle stage cost related to a probabilistic potential field that represents a probability that an obstacle is present around the target device and that is calculated based on a predetermined evaluation position,
- when the target device and the obstacle are in a proximity state where one of the target device and the obstacle is contained in a predetermined proximity region centered on the other of the target device and the obstacle, the model predictive controller generates the obstacle stage cost to perform the model predictive control, and
- when the target device and the obstacle are not in the proximity state, the model predictive controller performs the model predictive control without generating the obstacle stage cost.

9. The PLC according to claim 8, wherein
- the output of the target model controller is a multidimensional output, and
- when a downwardly convex function is defined as $g(x)$, the probabilistic potential field expressed by a function $|g(x)|-g(x)$ is set for one of the target device and the obstacle, and the predetermined evaluation position is set for the other one of the target device and the obstacle or near both the target device and the obstacle.

10. The PLC according to claim 8, wherein
- the output of the target model controller is a multidimensional output, and
- when an upwardly convex function is defined as $g(x)$, the probabilistic potential field expressed by a function $|g(x)|+g(x)$ is set for one of the target device and the obstacle, and the predetermined evaluation position is set for the other one of the target device and the obstacle or near both the target device and the obstacle.

11. The PLC according to claim 8, wherein
- a first potential field that represents a probability that the obstacle is present around the target device is set for the target device so as to conform to a shape of a predetermined part of the target device including an output part of the target device and so as to surround the predetermined part,
- a second potential field that represents a probability that the target device is present around the obstacle is set for the obstacle so as to conform to a shape of the obstacle and so as to at least partly surround the obstacle,
- when the first potential field at least partially overlaps the second potential field, the model predictive controller determines that both the target device and the obstacle are in the proximity state, sets the probabilistic potential field to each of the first potential field and the second potential field calculated based on the at least one predetermined evaluation position contained in an overlapping region of the first potential field and the second potential field, and generates the obstacle stage cost to perform the model predictive control, and
- when the first potential field does not overlap the second potential field at all, the model predictive controller determines that the target device and the obstacle are not in the proximity state and performs the model predictive control without generating the obstacle stage cost.

12. The PLC according to claim 11, wherein the processing unit is further configured to function as a detector configured to detect that the target device is in a deadlock state where the target device is not displaced smoothly during servo control related to following of the predetermined command, wherein
- when the detector detects the deadlock state, one or both of the first potential field and the second potential field are deformed, and
- the model predictive controller performs the model predictive control based on an overlapping relationship between the deformed first potential field and second potential field.

13. The PLC according to claim 12, wherein
- the model predictive controller is configured to repeatedly execute a predetermined operation in accordance with the predetermined evaluation function to obtain the output of the model predictive controller during the model predictive control, and
- when the number of times that the model predictive controller repeatedly executes a predetermined operation to obtain one output of the model predictive controller in the model predictive control exceeds a reference number of times, the detector detects that the target device is in the deadlock state.

14. The PLC according to claim 12, wherein when the target device and the obstacle are in the proximity state, in a case where the calculator obtains, as the target command, a predetermined complex number solution containing an imaginary number from the output of the target model controller in accordance with the geometric relationship of the machine structure, the detector detects that the target device is in the deadlock state.

15. The PLC according to claim 11, wherein the processing unit is further configured to function as a detector configured to detect that the target device is in a deadlock state where the target device is not displaced smoothly during servo control related to following of the predetermined command, wherein when the detector detects the deadlock state, one or more new potential fields are added to at least one of the target device and the obstacle, the one or more new potential fields differing from the first potential field or the second potential field, and the model predictive controller performs the model predictive control based on an overlapping relationship between a new first potential field for the target device and a new second potential field for the obstacle, some or all of the one or more new potential field being added to the new first potential field, the remaining one or ones of the one or more new potential field being added to the new second potential field.

16. The PLC according to claim 15, wherein the model predictive controller is configured to repeatedly execute a predetermined operation in accordance with the predetermined evaluation function to obtain the output of the model predictive controller during the model predictive control, and when the number of times that the model predictive controller repeatedly executes a predetermined operation to obtain one output of the model predictive controller in the model predictive control exceeds a reference number of times, the detector detects that the target device is in the deadlock state.

17. The PLC according to claim 15, wherein when the target device and the obstacle are in the proximity state, in a case where the calculator obtains, as the target command, a predetermined complex number solution containing an imaginary number from the output of the target model controller in accordance with the geometric relationship of the machine structure, the detector detects that the target device is in the deadlock state.

18. The PLC according to claim 8, wherein assuming that a second potential field is slid on an outer circumference of a first potential field, the probabilistic potential field is defined by a locus of a central point of the second potential field, the first potential field being representative of a probability that the obstacle is present around the target device and formed so as to conform to a shape of a predetermined part of the target device including an output part of the target device and so as to surround the predetermined part, the second potential field being representative of a probability that the target device is present around the obstacle and being formed so as to conform to a shape of the obstacle and at least partly surround the obstacle, the predetermined evaluation position is set to a central position of the second potential field, when the central position of the second potential field is positioned within a region of the probabilistic potential field, the model predictive controller determines that the target device and the obstacle are in the proximity state and generates the obstacle stage cost related to the probabilistic potential field to perform the model predictive control, and when the central position of the second potential field is positioned outside the region of the probabilistic potential field, the model predictive controller determines that the target device and the obstacle are not in the proximity state and performs the model predictive control without generating the obstacle stage cost.

19. The PLC according to claim 8, wherein the stage cost calculated from the predetermined evaluation function further contains a saturation-related cost related to at least one of the upper and lower thresholds of the control input, and the saturation-related cost is defined as a function in which, when a value of the control input exceeds the threshold, a value of the saturation-related cost is set to a larger value as a difference between the control input and the threshold increases and, when the control input is equal to or less than the threshold, the value of the saturation-related cost is set to zero.

* * * * *